(12) United States Patent
Horiike

(10) Patent No.: US 6,353,683 B1
(45) Date of Patent: Mar. 5, 2002

(54) METHOD AND APPARATUS OF IMAGE PROCESSING, AND DATA STORAGE MEDIA

(75) Inventor: Kazuyoshi Horiike, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/207,296

(22) Filed: Dec. 8, 1998

(30) Foreign Application Priority Data

Dec. 10, 1997 (JP) .............................................. 9-339678

(51) Int. Cl.⁷ ................................................ G06K 9/36
(52) U.S. Cl. ....................... 382/238; 382/236; 382/239; 348/699
(58) Field of Search ................................ 382/238, 236, 382/239; 348/699

(56) References Cited

U.S. PATENT DOCUMENTS

| | | | | |
|---|---|---|---|---|
| 5,398,078 A | * | 3/1995 | Masuda et al. | ............. 348/699 |
| 5,559,931 A | * | 9/1996 | Shindou et al. | ............... 358/1.5 |
| 5,657,087 A | | 8/1997 | Jeong et al. | ................. 348/416 |
| 5,719,986 A | | 2/1998 | Kato et al. | ................... 386/109 |

FOREIGN PATENT DOCUMENTS

JP    6-22296    1/1994    .......... H04N/7/137

* cited by examiner

*Primary Examiner*—Jose L. Couso
*Assistant Examiner*—Anh Hong Do
(74) *Attorney, Agent, or Firm*—Burr & Brown

(57) ABSTRACT

An image processing method in which an input image signal is coded for each of unit areas into which a frame is divided and a coded image signal is output, and a prediction image signal for a target unit area to be coded is generated by calculation according to prediction based on a decoded image signal obtained by decoding the coded image signal, for a desired unit area, comprises detecting largeness of calculation load in the process for coding the input image signal, and performing switching of the prediction in the process for generating the prediction image signal according to the detected largeness of the calculation load.

19 Claims, 12 Drawing Sheets

— PC(n)
 — PGC

| 4 | 5 | 5 | 5 | 5 | 5 | 5 | 4 |
|---|---|---|---|---|---|---|---|
| 5 | 5 | 5 | 5 | 5 | 5 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 5 | 5 | 5 | 5 | 5 | 5 |
| 4 | 5 | 5 | 5 | 5 | 5 | 5 | 4 |

— WVC

— PU(n)'
 — PGU

| 2 | 2 | 2 | 2 | 2 | 2 | 2 |
|---|---|---|---|---|---|---|
| 1 | 1 | 2 | 2 | 2 | 1 | 1 |
| 1 | 1 | 1 | 1 | 1 | 1 | 1 |
| 1 | 1 | 1 | 1 | 1 | 1 | 1 |

— WVU

— PD(n)'
 — PGD

| 1 | 1 | 1 | 1 | 1 | 1 | 1 |
|---|---|---|---|---|---|---|
| 1 | 1 | 1 | 1 | 1 | 1 | 1 |
| 1 | 1 | 2 | 2 | 2 | 1 | 1 |
| 2 | 2 | 2 | 2 | 2 | 2 | 2 |

— WVD

— PR(n)'
 — PGR

| 1 | 1 | 1 | 2 |
|---|---|---|---|
| 1 | 1 | 2 | 2 |
| 1 | 1 | 2 | 2 |
| 1 | 1 | 2 | 2 |
| 1 | 1 | 2 | 2 |
| 1 | 1 | 2 | 2 |
| 1 | 1 | 2 | 2 |
| 1 | 1 | 1 | 2 |

— WVR

— PL(n)'
 — PGL

— PG

| 2 | 1 | 1 | 1 |
|---|---|---|---|
| 2 | 2 | 1 | 1 |
| 2 | 2 | 1 | 1 |
| 2 | 2 | 1 | 1 |
| 2 | 2 | 1 | 1 |
| 2 | 2 | 1 | 1 |
| 2 | 2 | 1 | 1 |
| 2 | 1 | 1 | 1 |

— WVL

METHOD AND APPARATUS OF IMAGE PROCESSING, AND DATA STORAGE MEDIA

FIELD OF THE INVENTION

The present invention relates to a method and an apparatus of image processing, and a data storage medium and, more particularly to a method and an apparatus which are capable of coding or decoding an image signal without damaging a regenerated video even if a system which processes an image signal has low processing ability, and a data storage medium which contains a program for implementing coding and decoding the image signal by the method and the apparatus by software.

BACKGROUND OF THE INVENTION

In a prior art coding method for a digital moving image, since temporal correlation, i.e., correlation of image information between frames, is high in the moving image, a difference value between an image signal of a target frame to be coded and a prediction signal obtained from an image signal of a previous frame which has been coded (before the target frame is coded) is coded, in order to eliminate redundant image information between frames and thereby reduce temporal redundancy.

This coding process is called a "differential coding process", and is performed for each of unit areas into which one frame is divided. The frame corresponds to one frame according to MPEG (Moving Picture Experts Group) 1 and 2, and corresponds to an object area, i.e., an image display space corresponding to an object image according to MPEG4.

To be specific, the differential coding process detects a prediction area in the previous frame which comprises an image signal having the smallest error with respect to an image signal (input image signal) of a target unit area to be coded, by motion prediction using the image information of the previous frame, and performs coding to a difference signal corresponding to a difference value between the image signal of the target unit area and the prediction signal (an image signal in the prediction area) for the target unit area along with prediction relevant information associated with the motion prediction. The prediction relevant information is, for example, information indicating a position of the prediction area, namely, a motion vector.

Meanwhile, a differential decoding process regenerates an image signal based on a coded difference signal generated by the differential coding process. The differential decoding process uses motion compensation to predict a regenerated image signal (decoded image signal) for a target unit area to be decoded and thereby generate a prediction signal (decoded prediction image signal) according to the prediction relevant information, decodes the coded difference signal of the target unit area to generate a decoded difference signal, and adds the prediction signal to the decoded difference signal to generate a regenerated image signal corresponding to the target unit area.

As described above, in the conventional process for coding or decoding the image signal, techniques for compressing image data such as motion prediction or motion compensation have been employed. A specific example of implementation of these is data compression according to MPEG1 or MPEG2 as an international standard.

Attempts are being made to extend standardization of techniques according to MPEG4 being standardized, by introducing new motion prediction or motion compensation into them, in addition to the motion prediction and motion compensation according to MPEG1 or MPEG2.

The motion prediction detects the information indicating the position of the prediction area, i.e., the motion vector, in the coding process. The motion compensation generates the prediction signal according to the motion vector in the coding process or the decoding process.

One of such introduction is overlapping motion compensation. Hereinafter, a description will be given of normal motion compensation and overlapping motion compensation by an image processing technique according to MPEG1 and MPEG2. For the sake of simplicity, a luminance signal is shown as a signal to be subjected to motion compensation. The overlapping motion compensation is commonly performed in the decoding process, including a local decoding process in the coding process, and therefore the decoding process will be discussed.

In a prior art decoding process according to MPEG1 and MPEG2, the motion compensation is performed for each unit area corresponding to a two-dimensional image space (macroblock) comprising 256 pixels (16×16 pixels).

FIGS. 7(a)–7(d) show motion compensation in the decoding process.

Turning now to FIG. 7(a), for a target macroblock MB(n) in a target frame F(n) being decoded at a current time t(n), a motion vector MV(n) is used to find a prediction area PR(n) in a previous frame F(n-1) which has been decoded at a past time t(n-1) The target macroblock MB(n) and the corresponding macroblock MB(n-1) are present in the same position in the target frame F(n) and the previous frame F(n-1), respectively. The prediction area PR(n) is apart from the corresponding macroblock MB(n-1) by a displacement indicated by the motion vector MV(n), in the previous frame F(n-1)

Then, an image signal included in the prediction area PR(n) is found as a prediction signal (decoded prediction image signal) for a decoded image signal of the target macroblock MB(n).

FIGS. 7(b)), 7(c), and (d), show the macroblock MB(n-1), the prediction area PR(n), and the target macroblock MB(n) in FIG. 7(a), respectively.

The overlapping motion compensation is performed for each unit area, i.e., a two-dimensional image space (block) comprising 64 pixels (8×8 pixels). 4 of these blocks correspond to one macroblock. In other words, one macroblock is composed of (2×2) blocks, as shown in FIG. 8.

In the overlapping motion compensation, the motion vector is present for each block or for each macroblock. Assume that motion vectors for the 4 blocks in the macroblock are the same when the motion vector is for the macroblock.

A description will be given of overlapping motion compensation with reference to FIG. 9.

Herein, a description will be given of generation of a prediction signal (a decoded prediction image signal) of the target block EC(n) in the target frame F(n).

Initially, by the use of the motion vector MVC of the target block BC(n), motion vectors MVU, MVD, MVR, and MVL of neighboring blocks BU(n), BD(n), BR(n), and BL(n) which are positioned above, below, right, and left with respect to the block BC(n), 5 prediction areas of the target block BC(n) are found by using the corresponding block BC(n-1) in the previous frame F(n-1) as a criterion. The motion vectors MVU, MVD, MVR, and MVL indicate areas PU(n), PD(n), PR(n), and PL(n) in the previous frame F(n-1) as the prediction areas of the blocks BU(n), BD(n), BR(n), and BL(n) in the previous frame F(n-1), and therefore the 4 prediction areas of the target block BC(n) found by the use of these motion vectors are, as shown in FIG. 10(a), areas PU(n)', PD(n)', PR(n)', and PL(n)'. In addition, by the use of the motion vector MVC of the target block BC(n), the prediction area PC(n) is found for the target block BC(n).

Subsequently, from pixels in the 5 prediction areas PC(n), PU(n)', PD(n)', PR(n)' and PL(n)', prediction images PGC, PGU, PGD, PGR, and PGL in FIG. 10(b) are found. It should be remembered that unnecessary pixels in respective prediction areas are not used. To be specific, the prediction images of the prediction area PU(n)', the prediction area PD(n)', the prediction area PR(n)', and the prediction area PL(n)' are formed from pixels in the upper portion, pixels in the lower portion, pixels in the right portion, and pixels in the left portion, respectively.

Then, values of pixels in the prediction images, PGC, PGU, PGD, PGR, and PGL, are weighted by values shown by weighting matrixes WVC, WVU, WVD, WVR, and WVL(see FIG. 10(c)). Weighting values shown in respective weighting matrixes are added for each pixel, to obtain "8". Pixel values Pg of a composite image PG is found according to the following expression:

$$Pq=(Pqc \cdot Wvc+Pqu \cdot Wvu+Pgd \cdot Wvd+Pgr \cdot Wvr+Pgl \cdot Wvl)/8$$

wherein Pgc, Pgu, Pgd, Pgr, and Pgl are pixel values of the respective prediction images PGC, PGU, PGD, PGR, and PGL, and Wvc, Wvu, Wvd, Wvr, and Wvl are weighting values shown by the respective weighting matrixes.

The composite image PG resulting from this composition is the prediction image resulting from the overlapping motion compensation, and an image signal corresponding thereto is the prediction signal (decoded prediction image signal).

In the overlapping motion compensation, when the target block to-be-subjected to motion compensation is positioned in the lower portion of a macroblock, the motion vector of the target block is used as motion vectors of neighboring blocks in the lower portion, since the macroblock including the neighboring blocks has not been decoded. Needless to say, the overlapping motion compensation is performed in local decoding process included in coding process in the same manner that the overlapping motion compensation is performed in the decoding process.

As described above, the normal motion compensation generates the prediction image (prediction signal) by the use of the motion vector of the area to-be-subjected to motion compensation (macroblock), while the overlapping motion compensation generates the prediction image (prediction signal) by the use of the motion vectors of the neighboring blocks adjacent to the target block as well as the motion vector of the target block to-be-subjected to the overlapping motion compensation. For this reason, in contrast with the normal motion compensation, the overlapping motion compensation makes difference values between the image signal of the target block (values of respective pixels) and the prediction signal (prediction values of respective pixels) uniform in a block. This means that large coding distortion which is locally present in the macroblock is distributed therein. The overlapping motion compensation improves visual image quality, but requires more calculation than the normal motion compensation.

A description will now be given of an object-by-object motion compensation in the decoding process according to MPEG4.

In image display according to MPEG4, objects areas in a target frame and a previous frame are present in different positions.

Turning now to FIG. 12, at a decoding end, for a target macroblock MB(n) in an object area OR(n) in a target frame F(n) being decoded at a current time t(n), a motion vector MV(n) is used to find a prediction area PR(n) in the corresponding object area OR(n-1) in a previous frame F(n-1) which has been decoded at a past time t(n-1).

The prediction area PR(n) is positioned apart from the corresponding macroblock MB(n-1) by a displacement indicated by the motion vector MV(n), in the previous frame F(n-1).

While in the previous frame P(n-1), a position P(n) in the object area OR(n) at t(n) differs from a position P(n-1) in an object area OR(n-1) at t(n-1), a position Pmb(n) of the macroblock MB(n) in the object area OR(n) in the target frame F(n), a position Pmb(n-1) of the macroblock MB(n-1) in-the object area OR(n-1) in the previous frame F(n-1), and a position Ppr (n) of the prediction area PR(n) are determined as absolute positions with respect to a position PO on a upper-left corner of each frame.

The image signal of the prediction area PR(n) is found as the prediction signal (decoded prediction image signal) for the decoded image signal of the target macroblock MB(n) in the target frame F(n).

As in the case of MPEG1 and 2, the overlapping motion compensation according to MPEG4 is performed for each unit area corresponding to a two-dimensional image space (block) comprising 64 pixels (8×8 pixels), for the object areas OR(n) and OR(n-1) as shown in FIG. 12, as already shown in FIG. 9.

Thus, to improve coding efficiency in the coding process, various prediction signal generating methods have been proposed and adopted by standards for the coding method, and more and more methods would be expected to be conceived.

However, in many cases, while new motion prediction or new motion compensation improves coding efficiency, it makes calculation more complicated than the conventional process, as already described in the overlapping motion compensation. Accordingly, high processing ability is demanded of an image processing system for real time processing.

In addition, since a system which performs the prior art image coding process and image decoding process, performs motion compensation by calculation according to a prediction signal generating method decided in the coding process, frames are sometimes skipped in a video regenerated in real time if processing ability in the decoding process is low.

In other words, in a case where the prior art image processing system has low processing ability resulting from introduction of new motion prediction or motion compensation, quality of a regenerated image is adversely affected.

SUMMARY OF THE INVENTION

It is an object of the present invention to provide a method and an apparatus which are capable of performing switching of a process for generating a prediction signal for a target image signal between a lightly loaded process and a heavily loaded process, depending upon the calculation load, when coding or decoding an image signal, thereby performing motion prediction or motion compensation with high efficiency while suppressing adverse effects on a regenerated video, and a data storage medium which contains a program for implementing image processing by the method and the apparatus in a computer system.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a first aspect of the present invention, an image processing method for coding an input image signal for each of unit areas into which a frame is divided and outputting a coded image signal, and generating a prediction image signal for a target unit area to be coded in a desired unit area by calculation according to prediction based on a decoded image signal obtained by decoding the coded image signal, comprises: detecting largeness of calculation load in the process for coding the input image signal, and performing switching of the prediction in the process for generating the prediction image signal according to the detected largeness of the calculation load. Therefore, the calculation load does not exceed the processing ability of the system which performs the coding process. Thereby, at the decoding end, frames are not skipped in the video regenerated in real time. As a result, the image quality of the regenerated image is not adversely affected by the increased load resulting from the process for generating the prediction signal.

According to a second aspect of the present invention, in the image processing method of the first aspect, the prediction in the process for generating the prediction image signal is switched between a first prediction which requires a large amount of calculation and a second prediction which requires a small amount of calculation, according to a result of comparison between a threshold of the calculation load determined from processing ability required for the process for generating the prediction signal in real time and the detected largeness of the calculation load. Thereby, coding efficiency is improved without degrading the image quality of the regenerated image.

According to a third aspect of the present invention, in the image processing method of the first aspect, the prediction adapted to the detected largeness of the calculation load is selected among plural types of prediction which differ from one another in amount of calculation, according to a result of comparison between a threshold of the calculation load determined from processing ability required for the process for generating the prediction signal in real time and the detected largeness of the calculation load. Therefore, it is possible to select the amount of calculation among many alternatives within a wider range. In addition, since the proportion of the amount of signals processed in the motion prediction to:the total amount of signals processed in the coding process is high, the change of the motion prediction significantly reduces the calculation load in the transmission system.

According to a fourth aspect of the present invention, in the image processing method of the first aspect, the process for generating the prediction image signal includes motion prediction for finding a motion vector indicating a position of a prediction area of the target unit area by predetermined pixel precision, and motion compensation for finding an image signal of the prediction area as the prediction image signal by the use of the motion vector, the motion prediction is switched between motion prediction which requires a large amount of calculation and motion prediction which requires a small amount of calculation, according to a result of comparison between a threshold of the calculation load determined from processing ability required for the process for generating the prediction signal in real time and the detected largeness of the calculation load, and the motion compensation is switched between motion compensation which requires a large amount of calculation and motion compensation which requires a small amount of calculation, according to the result of comparison. Therefore, it is possible to select the amount of calculation among many alternatives within a wider range.

According to a fifth aspect of the present invention, in the image processing method of the first aspect, the process for generating the prediction image signal includes motion prediction for finding a motion vector indicating a position of a prediction area of the target unit area by predetermined pixel precision, and motion compensation for finding an image signal of the prediction area as the prediction image signal by the use of the motion vector, and the motion prediction is switched between motion prediction for finding a motion vector of higher pixel precision and motion prediction for finding a motion vector of lower pixel precision, according to a result of comparison between a threshold of the calculation load determined from processing ability required for the process for generating the prediction signal in real time and the detected largeness of the calculation load. Therefore, the relatively simple process, i.e., the change of the pixel precision, can improve coding efficiency without degrading the regenerated image.

According to a sixth aspect of the present invention, in the image processing method of the first aspect, the process for generating the prediction signal includes motion prediction for finding a motion vector indicating a position of a prediction area of the target unit area by predetermined pixel precision, and motion compensation for finding an image signal of the prediction area as the prediction image signal by the use of the motion vector, and the motion compensation is switched between motion compensation for finding the prediction image signal by the use of a motion vector of higher pixel precision and motion compensation for finding the prediction image signal by the use of a motion vector of lower pixel precision, according to a result of comparison between a threshold of the calculation load determined from processing ability required for the process for generating the prediction signal in real time and the detected largeness of the calculation load. Therefore, the relatively simple process can improve coding efficiency without degrading the regenerated image.

According to a seventh aspect of the present invention, in the image processing method of the sixth aspect, the motion compensation performed by the use of the motion vector of higher pixel precision is switched between first motion compensation which is heavily loaded and second motion compensation which is lightly loaded, according to the result of comparison, and the motion compensation performed by the use of the motion vector of lower pixel precision is switched between first motion compensation which is heavily loaded and second motion compensation which is lightly loaded, according to the result of comparison. Therefore, it is possible to select the amount of calculation among many alternatives within a wide range.

According to an eighth aspect of the present invention, in the image processing method of the first aspect, the process for generating the prediction image signal includes motion prediction for finding a motion vector indicating a position of a prediction area of the target unit area by predetermined pixel precision, and motion compensation for finding an image signal of the prediction area as the prediction image signal by the use of the motion vector, and one of plural types of motion compensation which use motion vectors of different pixel precision is selected as the motion compensation, according to a result of comparison between a threshold of the calculation load determined from processing ability required for the process for generating the prediction signal in real time and the detected largeness of the calculation load. Therefore, the relatively simple process can change amount of calculation appropriately.

According to a ninth aspect of the present invention, an image processing method for decoding an input coded image signal for each of unit areas into which a frame is divided and outputting a decoded image signal, and generating a decoded prediction image signal for a target unit area to be decoded in a desired unit area by calculation according to predetermined motion compensation based on the decoded image signal, comprises detecting largeness of calculation load in the process for decoding the coded image signal, and performing switching of motion compensation in the process for generating the prediction image signal according to the detected largeness of the calculation load. Therefore, the image quality of the regenerated image is not adversely affected by the increased load resulting from the process for generating the prediction signal.

According to a tenth aspect of the present invention, in the image processing method of the ninth aspect, the motion compensation is switched between first motion compensation which requires large amount of calculation and second motion compensation which requires small amount of calculation, according to a result of comparison between a threshold of the calculation load determined from processing ability required for the process for generating the prediction signal in real time and the detected largeness of the calculation load.

Therefore, it is possible to perform decoding process adapted to the coding process which improves coding efficiency without degrading the image quality of the regenerated image.

According to an eleventh aspect of the present invention, in the image processing method of the ninth aspect, the motion compensation adapted to the detected largeness of the calculation load is selected among plural types of motion compensation which differ from one another in amount of calculation, according to a result of comparison between a threshold of the calculation load determined from processing ability required for the process for generating the prediction signal in real time and the detected largeness of the calculation load. Therefore, it is possible to select amount of calculation among many alternatives within a wide range.

According to a twelfth aspect of the present invention, in the image processing method of the ninth aspect, the motion compensation is switched between motion compensation for finding the decoded prediction image signal by the use of a motion vector of higher pixel precision and motion compensation for finding the decoded prediction image signal by the use of a motion vector of lower pixel precision, according to a result of comparison between a threshold of the calculation load determined from processing ability required for the process for generating the prediction signal in real time and the detected largeness of the calculation load. Therefore, the relatively simple process can change amount of calculation appropriately.

According to a thirteenth aspect of the present invention, in the image processing method of the twelfth aspect, the motion compensation performed by the use of the motion vector of higher pixel precision is switched between first motion compensation which is heavily loaded and second motion compensation which is lightly loaded, according to the result of comparison, and the motion compensation performed by the use of the motion vector of lower pixel precision is switched between first motion compensation which is heavily loaded and second motion compensation which is lightly loaded, according to the result of comparison. Therefore, Therefore, it is possible to select the amount of calculation among many alternatives within a wider range According to a fourteenth aspect of the present invention, an image processing apparatus including a coding unit for coding an input image signal for each of unit areas into which a frame is divided and outputting a coded image signal, and a predicting unit for generating a prediction image signal for a target unit area to be coded in a desired unit area by calculation according to predetermined prediction, wherein the predicting unit includes calculation load detecting means for detecting largeness of calculation load in the process for coding the input image signal, and performs switching of the prediction in the process for generating the prediction signal according to the detected largeness of the calculation load. Therefore, the calculation load does not exceed the processing ability of the system which performs the coding process. Thereby, at the decoding end, frames are not skipped in the video regenerated in real time. As a result, the image quality of the regenerated image is not adversely affected by the increased load resulting from the process for generating the prediction signal.

According to a fifteenth aspect of the present invention, in the image processing apparatus of the fourteenth aspect, the predicting unit includes a motion detector which outputs a motion vector indicating a position of a prediction area in a previous frame comprising a prediction image signal for the target unit area, based on the input image signal of the target unit area in a target frame to be coded and a decoded image signal of the previous frame which has been decoded; and a motion compensator for generating the prediction image signal by the use of the motion vector of the target unit area which is output from the motion detector; the motion detector outputting one of a first motion vector of lower pixel precision and a second motion vector of higher pixel precision to the motion compensator as the motion vector, according to the detected largeness of the calculation load. Thereby, coding efficiency is improved without degrading the image quality of the regenerated image.

According to a sixteenth aspect of the present invention, an image processing apparatus including a decoding unit for decoding an input coded image signal for each of unit areas into which a frame is divided and outputting a decoded image signal, and a predicting unit for generating a decoded prediction image signal for a target unit area to be decoded in a desired unit area by calculation according to predetermined motion compensation, wherein the predicting unit includes calculation load detecting means for detecting largeness of calculation load in the process for decoding the coded image signal, and performs switching of motion compensation in the process for generating the decoded prediction image signal, according to the detected largeness of the calculation load. Therefore, the calculation load does not exceed the processing ability of the system which performs the coding process. Thereby, at the decoding end, frames are not skipped in the video regenerated in real time. As a result, the image quality of the regenerated image is not adversely affected by the increased load resulting from the process for generating the prediction signal.

According to a seventeenth aspect of the present invention, in the image processing apparatus of the sixteenth aspect, the predicting unit generates the decoded prediction image signal by the use of a motion vector indicating a position of a prediction area in a previous frame which has been decoded before the target frame is decoded and comprises the decoded prediction image signal for the target unit area, and includes a motion compensator which selects and performs one of first motion compensation which requires small amount of calculation for generating the decoded prediction image signal for the target unit area by the use of the motion vector of the target unit area and second motion compensation which requires large amount of calculation for generating the decoded prediction image signal by the use of the motion vector of the target unit area and its neighboring unit areas, according to the detected largeness of calculation load. Therefore, it is possible to perform decoding process adapted to the coding process which improves coding efficiency without degrading the image quality of the regenerated image.

According to an eighteenth aspect of the present invention, a data storage medium for storing a program which makes computer image coding process, comprises coding an input image signal for each of unit areas into which a frame is divided and outputting a coded image signal, and generating a prediction image signal for a target unit area to be coded in a desired unit area by calculation according to predetermined prediction based on a decoded image signal obtained by decoding the coded image signal, wherein largeness of calculation load in the process for coding the input image signal is detected, and switching of prediction in the process for generating the prediction image signal is performed according to the detected largeness of the calculation load. Therefore, the computer can realize the coding process wherein the calculation load does not exceed the processing ability of the system which performs the coding process, and thereby at the decoding end, frames are not skipped in the video regenerated in real time, whereby the image quality of the regenerated image is not adversely affected by the increased load resulting from the process for generating the prediction signal.

According to a nineteenth aspect of the present invention, a data storage medium for storing a program which makes a computer perform image decoding process, comprises the step of decoding an input coded image signal for each of unit areas into which a frame is divided and outputting a decoded image signal, and generating a decoded prediction image signal for a target unit area to be decoded in a desired unit area by calculation according to predetermined motion compensation based on the decoded image signal, wherein largeness of calculation load in the process for decoding the coded image signal is detected, and switching of motion compensation in the process for generating the decoded prediction image signal is performed according to the detected largeness of the calculation load. Therefore, the computer can realize the decoding process wherein the calculation load does not exceed the processing ability of the system which performs the decoding process, and thereby at the decoding end, frames are not skipped in the video regenerated in real time.

DETAILED DESCRIPTION OF THE PREFERRED EMBODIMENTS

Now, a description will be given of preferred embodiments of the present invention with reference to FIGS. 1 through 11

Embodiment 1

Figure 1:
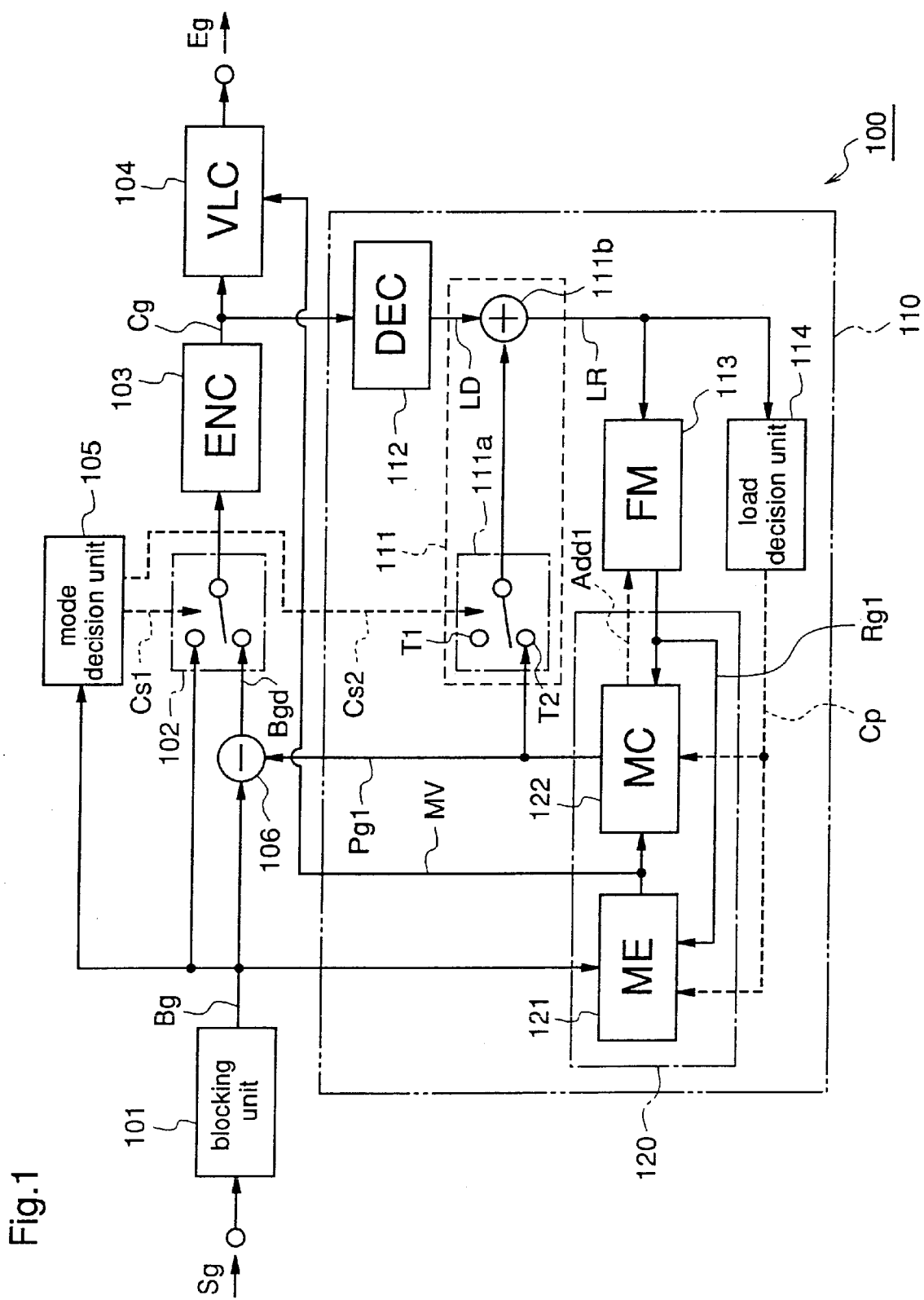
FIG. 1 is a block diagram showing an image coding apparatus according to a first embodiment of the present invention.

FIG. 1 is a block diagram for explaining an image coding apparatus as an image processing apparatus according to a first embodiment of the present invention.

Turning now to FIG. 1, there is shown an image coding apparatus 100. The image coding apparatus 100 is capable of processing an image signal corresponding to an object area according to MPEG4 as well as an image signal corresponding to a frame according to MPEG1 and 2. The image signals are processed in the same manner, and therefore a description will be given of processing of a frame image signal. According to MPEG4, as in the case of the process for coding the image signal corresponding to one frame, image signals of respective object areas are coded separately, and synthesized to generate a bit stream to be output.

To be more detailed, the image coding apparatus 100 includes a blocking unit 101 which receives an input image signal Sg and performs blocking process to the signal Sg so that it is divided into image signals Bg corresponding to respective blocks as coding units (hereinafter referred to as blocked image signals), a mode decision unit 105 which decides a coding mode of a target block to be coded based on the output Bq of the blocking unit 101, and outputs one of control signals cs1 and Cs2 according to the decision result, and a prediction signal generating unit (prediction processing unit) 110 which performs prediction for the blocked image signal Bg of the target block to generate a prediction signal Pg1 of the target block (input prediction image signal) by operation according to a predetermined prediction method.

The image coding apparatus 100 further includes a subtracter 106 which outputs difference between the blocked image signal Bg of the target block and the prediction signal Pg1, a first switch 102 which selects one of the output Bg of the blocking unit 101 and an output (difference signal) Bgd of the subtracter 106, a data compressor 103 which compresses an output of the switch 102 and outputs a compressed image signal Cg, and a variable length encoder (VLC) 104 which performs variable length coding to the output Cg of the data compressor 103 and outputs a coded image signal Eg.

The data compressor 103 includes a DCT unit which subjects the image signal Bg or the difference signal Bgd to DCT (Discrete Cosine Transform), i.e., frequency transformation, and a quantizer which quantizes frequency components (DCT coefficients) resulting from the frequency transformation, and outputs quantization coefficients as the compressed image signal Cg. The switch 102 is controlled so that it selects the output Bg of the blocking unit 101 when the mode decision unit 105 decides that the blocked image signal of the target frame should be intra-frame coded with the use of intra-frame correlation, and selects the output Bgd of the subtracter 106 when the unit 105 decides that the image signal should be inter-frame coded with the use of inter-frame correlation.

The prediction signal generating unit 110 includes a data decompressor (DEC) 112 which decompresses the output Cg of the data compressor 103 and outputs the image signal Bg or the difference signal Bgd as a decompressed image signal LD, and an addition unit 111 which outputs the decompressed image signal LD when it is the decompressed image signal Bg, and adds the decompressed image signal LD to the prediction signal Pg1 when the image signal LD is the decompressed difference signal Bgd.

The data decompressor 112 includes an inverse quantizer which inversely quantizes the output Cg of the data compressor 103, and an IDCT (inverse discrete cosine transform) unit which subjects the output Cg of the data compressor 103 to inverse DCT process by transforming data in a frequency domain to data in a spatial domain into data in a spatial domain, and outputs the decompressed image signal LD. The addition unit 111 includes a second switch 111a controlled in accordance with the control signal Cs2 from the mode decision unit 105, and an adder 110b for adding the output of the switch 111a and the output LD of the data decompressor 112. The switch 111a is controlled so that it selects an open input terminal T1 when the mode decision unit 105 decides that the blocked image signal Bg should be intra-frame coded, and selects an input terminal T2 to which the prediction signal is input when the mode decision unit 105 decides that the blocked image signal Bg should be intra-frame coded.

The prediction image signal generating unit 110 includes a frame memory 113 which stores the output LR of the adder 111b as a regenerated image signal of the previous frame, a load decision unit 114 which receives the output LR of the adder 111b and decides largeness of calculation load in the coding process frame by frame, and a calculating unit 120 which performs calculation on a load signal Cp indicating largeness of calculation load which is output from the load decision unit 114, to find the prediction signal of the blocked image signal Bg.

The load decision unit 114 is used to make comparison between a load index R indicating largeness of calculation load and a threshold TH of calculation load determined from processing ability of the image coding apparatus 100, to decide whether or not the processing ability is sufficient per motion compensation, the index R being represented by amount of calculation per unit time (per frame)in the coding process, and the threshold TH being represented by amount of calculation per unit time in the coding process which is required for overlapping motion compensation by the use of the motion vector of 0.5-pixel precision. The construction of the load decision unit 114 is not limited thereto. For example, the decision unit 114 may be used to receive only a timing at which local decoding process of a frame image signal is completed from the memory 313 or the like, convert this timing interval into the index R and make comparison between the resulting index R and the threshold TH, to decide the processing ability. In this case, it is not necessary to send the locally decoded image signal, i.e., the output LR of the adder 111b, to the load decision unit 114, which significantly reduces data to be sent thereto.

The calculating unit 120 includes a motion detector (ME) 121 which finds motion displacement information (motion vector) MV in the previous frame indicating an area (prediction area) in the previous frame which is as large as the target block, based on the output Rg1 of the frame memory 113 and the blocked image signal Bg, the prediction area including an image signal having the smallest error with respect to the blocked image signal Bg, and a motion compensator (MC) 122 which generates an address Add1 of the frame memory 113 according to the motion vector MV from the motion detector 121, and performs calculation on an image signal in a memory area of the address Add1 to generate the prediction signal Pg1.

In the first embodiment, the motion detector 121 is used to receive the output Bg of the blocking unit 101 and the output Rg1 of the frame memory 113, perform calculation according to the load signal Cp to find a first motion vector of lower precision (a motion vector of 1(one)-pixel precision) or a second motion vector of higher precision (a motion vector of 0.5-pixel precision), and output one of the first and second motion vectors to the motion compensator 122. In other words, the motion detector 121 performs first calculation to generate the motion vector of 1-pixel precision when the calculation load is large, while it performs second calculation to find the motion vector of 0.5-pixel precision from the motion vector of 1-pixel precision, in addition to the first calculation, when the calculation load is small.

The motion compensator 122 is used to perform switching between the normal motion compensation and the overlapping motion compensation, for performing motion compensation to find the prediction signal by the use of the motion vector output from the motion detector 121, according to the output Cp of the load decision unit 114. To be specific, the motion compensator 122 performs the normal motion compensation which decreases amount of calculation when the calculation load is large, while it performs the overlapping motion compensation which increases amount of calculation but improves an image quality when the calculation load is small.

Figure 2:
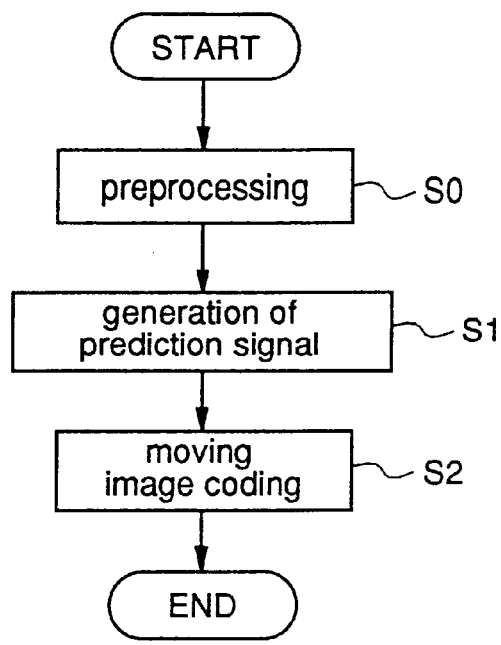
FIGS. 2(*a*) and 2(*b*) are flowcharts, wherein FIG. 2(*a*) shows a coding process performed by the image coding apparatus of the first embodiment, and FIG. 2(*b*) shows a process for generating a prediction signal.
Figure 2:
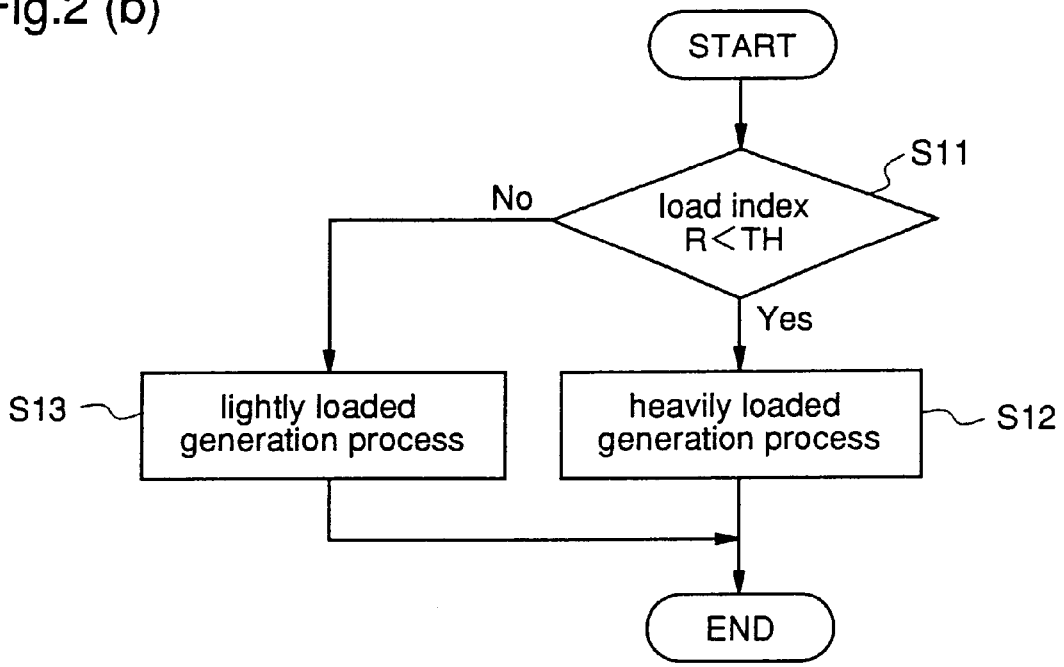
Figure 3:
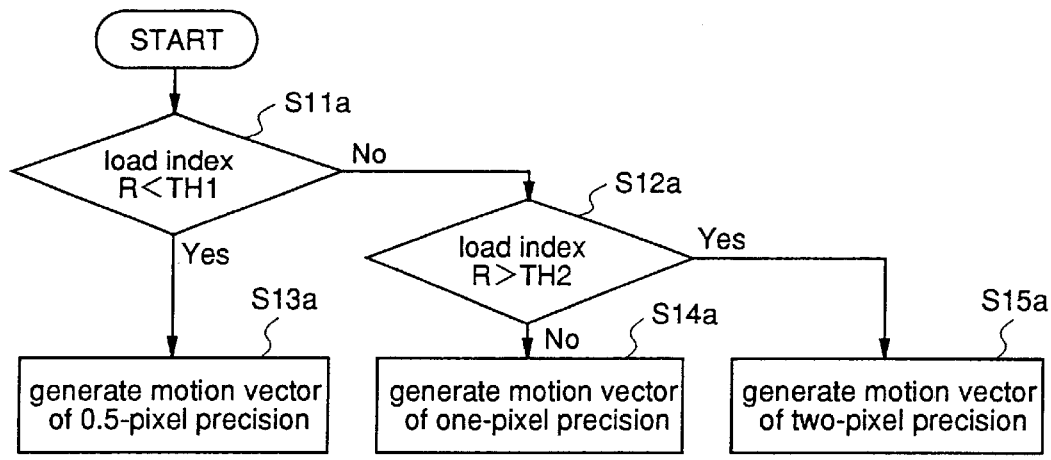
FIGS. 3(*a*) and 3(*b*) are flowcharts showing processes for generating prediction signals performed by image coding apparatuses according to first and second modifications of the first embodiment, respectively.
Figure 3:
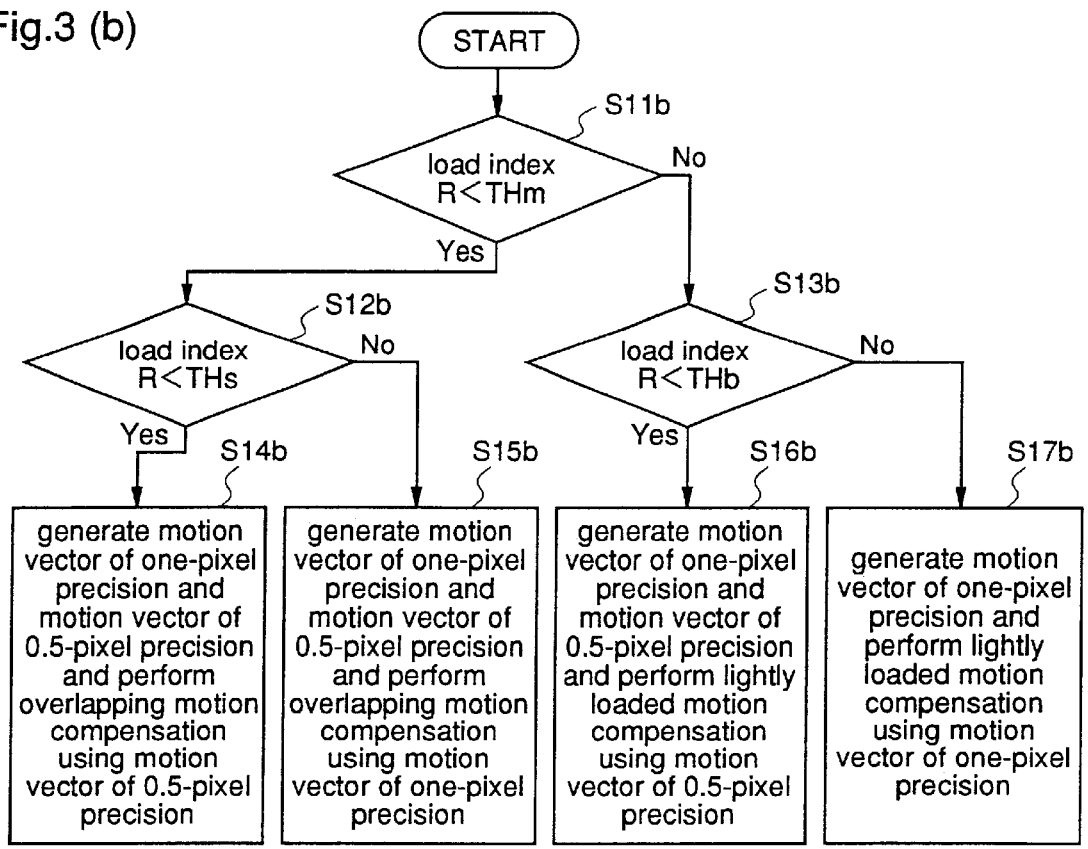

Subsequently, a description will be given of operation. FIG. 2 shows a flowchart for explaining process for coding the image signal performed by the image processing apparatus of the first embodiment.

When the input image signal Sg is input to the image coding apparatus 100, in Step S0, preprocessing is performed.

To be specific, the blocking unit 101 performs blocking to the image signal Sg so that it is divided into image signals corresponding to respective blocks of a predetermined size into which a frame is divided, and outputs the blocked image signals Bg. While the image signal Sg is divided into block areas of a rectangular shape each comprising (8×8) or (16×16) pixels, the image signal Sg may be divided into block areas of an arbitrary shape The mode decision unit 105 decides the coding mode of each blocked image signal Bg, that is, it decides whether an intra-frame coding using intra-frame correlation or inter-frame coding using inter-frame correlation is performed, and outputs one of the control signals Cs1 and Cs2 according to the decision result.

Then, in Step S1, the prediction signal is generated. The data decompressor 112 of the prediction signal generating unit 110 decompresses the compressed image signal Cg, and outputs the decompressed image signal LD. In the case of the inter-frame coding process, the adder 111b addes the decompressed image signal LD to the prediction signal Pg1, and outputs the regenerated image signal LR to the frame memory 113 and the load decision unit 114. On the other hand, in the case of the intra-frame coding process, the prediction process is not performed.

The image signal Bg of the target block is input to the calculating unit 120. The decompressed image signal LD is also supplied to the calculating unit 120 from the frame memory 113 as the image signal of the previous frame which has been coded. The calculating unit 120 performs calculation to generate the prediction signal according to the decision output Cp of the load decision unit 114.

To be specific, the blocked image signal Bg is input to the motion detector 121, and simultaneously the regenerated image Signal Rg1 is read from the frame memory 113 thereto, as the image signal of the previous frame.

The motion detector 121 detects the prediction area in the previous frame including the image signal having the smallest error with respect to the image signal Bg of the target block, and outputs the motion displacement information (hereinafter referred to as motion vector) MV indicating the corresponding block in the previous frame as the criterion, according to block matching or the like. The motion vector MV is sent to the motion compensator 122, which generates the prediction signal from the image signal of the prediction area in the previous frame simultaneously, the motion vector MV is supplied to the variable length encoder 104, where it is converted into a variable length code.

The motion detector 121 detects the motion vector and the motion compensator 122 generates the prediction signal according to the output Cp of the mode decision unit 104.

FIG. 2(a) is a flowchart showing flow of the process for generating the prediction signal. Turning to FIG. 2(a), in Step S11 (Load Decision step), the load decision unit 114 decides the load index R indicating largeness of calculation load at that point of time.

When decided that the index R is smaller than the threshold TH determined from the processing ability of the image coding apparatus 100, in Step S12, the process for generating the prediction signal is performed, which increases amount of calculation but improves coding efficiency. The motion detector 121 finds the motion vector of 1-pixel precision, and further finds the motion vector of 0.5-pixel precision based on the motion vector of 1-pixel precision, and outputs the motion vector of 0.5-pixel precision to the motion compensator 122. The motion compensator 122 performs overlapping motion compensation by synthesizing image signals of plural prediction areas at predetermined weighting rates set for respective pixels, by the use of the 0.5-pixel motion vector, to generate the prediction signal.

On the other hand, when decided that the index R is larger than the threshold TH, in Step S13, the process for generating the prediction signal is performed, which reduces amount of calculation and therefore is lightly loaded. The motion detector 121 outputs the motion vector of 1-pixel precision to the motion compensator 122 without finding the motion vector of 0.5-pixel precision. The motion compensator 122 performs the normal motion compensation by the use of the motion vector of 1-pixel precision, thereby outputting the prediction signal of the image signal of one prediction area.

Then in Step S2, the blocked image signal Bg or the difference signal Bgd is compressively coded.

By the output Cs1 of the mode decision unit 105, switching of the first switch 102 is controlled. When the blocked image signal Bg is coded in the intra-frame coding mode, it is output to the data compressor 103 through the switch 102. The data compressor 103 performs compression in such a manner that the DCT unit performs frequency transformation or the quantizer performs quantization process. This compression may be carried out by subband transform or vector quantization. The resulting quantized image signal Cg is supplied to the variable length encoder 104, and variable length coded therein.

On the other hand, when the blocked image signal Bg is coded in the inter-frame coding mode, the output (difference signal) Bgd of the subtracter 106 resulting from subtracting the prediction signal Pg1 from the blocked image signal Bg is output to the data compressor 103 through the switch 102. The difference signal Bgd is compressed by the data compressor 103 in the same manner that the image signal Bg is compressed.

Thus, in accordance with the first embodiment, the load decision unit 114 decides the largeness of the calculation load (index) R, and when decided that the index R is smaller than the threshold TH determined from the processing ability of the image coding apparatus 100, the generation process which increases amount of calculation but improves coding efficiency is performed, while when decided that the index R is larger than the threshold TH, the generation process which processes amount of calculation smaller than the former process is performed. Therefore, the prediction signal is generated with high efficiency at a decoding end while suppressing adverse effects on a video regenerated in real time caused by poor processing ability. Thereby, it is possible to realize coding process which increases efficiency and reduces degradation of the image quality of the regenerated image.

For instance, when the overlapping motion compensation is replaced by the normal motion compensation, the amount of data of pixel values to be input/output to/from the central calculating unit of the image coding apparatus is reduced to ⅓. In addition, it is possible to reduce multiplication in the weighting process of the overlapping motion compensation or calculation in the process for generating the address by the use of the motion vectors of the neighboring blocks.

While in the first embodiment, the index R is the amount of calculation in the coding process, it may be time necessary for predetermined calculation.

While in the first embodiment, decision process for the load is performed per motion prediction (detection of motion vector) for each block, the decision process need not be performed per motion prediction. For instance, the decision process may be carried out once at the starting of the coding process, and thereafter, the same decision result may be used, or it may be performed periodically frame by frame.

While in the first embodiment, the motion detector 121 and the motion compensator 122 perform switching of calculation processes according to largeness of the calculation load, either of these units 121 and 122 may perform this switching. To be specific, the motion detector 121 may perform switching between the process for generating the motion vector of 1-pixel precision and the motion vector of 0.5-pixel precision and the process for generating only the motion vector of 1-pixel precision, or the motion compensator 122 may perform switching between the normal compensation and the overlapping motion compensation. Moreover, the motion compensator 122 may select one of plural motion compensation processes (normal motion compensation) by the use of motion vectors of different pixel precision.

The process for generating the motion vector is implemented by hierarchical calculation process. That is, the motion vector of 0.5-pixel precision is generated by additional second calculation in addition to basic first calculation for generating the motion vector of 1-pixel precision, and the switching of the pixel precision is performed depending upon whether or not to perform the additional calculation. The process for generating the motion vector is not limited to this. For instance, there are provided with a first module for generating the motion vector of 1-pixel precision and a second module for generating the motion vector of 0.5-pixel precision, and the switching is performed between these, thereby performing switching of pixel precision.

The switching of the pixel precision is not limited to the switching between 0.5-pixel precision and 1-pixel precision. This may be performed between 0.5-pixel precision and 2(two)-pixel precision, or 1-pixel precision and 2-pixel precision, and further, one of 0.5-pixel precision, 1-pixel precision, and 2-pixel precision may be selected depending upon the calculation load. Moreover, as the pixel precision, higher precision, for example, 0.25-pixel precision or 0.125-pixel precision may be used.

While the process for generating the motion vector of 0.5-pixel precision is dispensed with, and the overlapping motion compensation is changed into the normal motion compensation when the load index R is larger than the threshold TH, bidirectional prediction or interlacing prediction may be changed into forward prediction or frame prediction, respectively, in order to reduce amount of calculation.

In the case of the overlapping motion compensation processes which perform the same process but differ from one another in implementing methods, the processes are performed at different rates, and therefore switching may be performed among the overlapping motion compensation process of different implementing methods. The implementing methods vary depending upon what process is optimized by CPU, for example, access to a memory or calculation such as addition. These implementing methods differ from each other.

To be more detailed, it is possible to perform switching between a first implementing method which implements plural data memories in a memory space in software for the overlapping motion compensation, and a second implementing method which has data memories fewer than the plural data memories. In the first implementing method, the memory space for use in the process is smaller than that for use in the second implementing method. For this reason, data access to the data memories can be performed by the first method at a speed higher than data access by the second method, although the processing speed of the first method is lower than that of the second method. Changing the first and second implementing methods depending upon the status of the overlapping motion compensation, improves processing speed of the whole motion compensation process.

The calculation load can be reduced by high-speed calculation which lowers calculation precision in the coding process. Also, the calculation load can be reduced by high-speed calculation which implements high-speed calculation algorithm in which the calculation speed depends upon amount of data accessed to CPU or the number of memories, or the calculation load can be changed in the process for generating the prediction signal by changing the calculation precision or the calculation algorithm.

While the motion detector or the motion compensator performs selects one of the process which increases amount of calculation and the process which decreases amount of calculation, it may select one of plural (at least three) types of calculation processes. Hereinafter, a description will be given of this, as modification 1 of the first embodiment.

Modification 1 of the First Embodiment

In the modification 1 of the first embodiment, in the calculating unit 120, the motion detector 121 is used to select one of plural calculating processes (at least three) which differ from one another in amount of calculation depending upon largeness of calculation load, and the motion compensator 122 is used to perform no switching between calculating processes irrespective of largeness of the calculation load.

To be specific, in this modification 1, the role of the load decision unit 114 is, based on a first threshold TH1 as an index of the calculation load and a second threshold TH2 larger than the first threshold T1, to decide whether the largeness of the load calculation is not larger than the first threshold TH1, it is between the first and second thresholds TH1 and TH2, or it is not smaller than the second threshold TH2. The first and second thresholds TH1 and TH2 are determined from the processing ability of the image coding apparatus. The motion detector 121 is used to generate one of a lower-precision motion vector of 2-pixel precision, a higher-precision motion vector of 0.5-pixel, and an intermediate-precision motion vector of 1-pixel precision, as motion displacement information indicating a prediction area of a target block, according to a decision result by the decision unit 114 The motion compensator 122 is used to perform normal motion compensation by the use of the motion vector of 1-pixel precision irrespective of largeness of the calculation load.

Subsequently, a brief description will be given of operation.

FIG. 3(a) shows flow of process performed by the calculating unit according to the modification 1 of the first embodiment.

In this modification 1 of the first embodiment, the motion detector 121 detects a motion vector according to a load decision output Cp of the load decision unit 104, and the motion compensator 122 generates the prediction signal by a method (motion compensation process) irrespective of the load decision output Cp.

Turning to FIG. 3(a), in a load decision step S11a, the load decision unit 114 decides whether or not a load index R indicating largeness of calculation load at that point of time is smaller than the first threshold TH1.

When decided that the load index R is smaller than the first threshold TH1, in step S13a, the motion detector 121 generates the motion vector of 0.5-pixel precision. On the other hand, when decided that the load index R is not smaller than the first threshold TH1 in Step S11a, in Step S12a, it is decided whether or not the load index R is larger than the second threshold TH2.

When decided that the load index R is not larger than second threshold TH2 in Step S12a, the motion detector 121 generates the motion vector of 1-pixel precision in Step S14a, whereas when decided that the load index R is larger than the threshold TH2, the motion detector 121 generates the motion vector of 2-pixel precision in Step s15a.

The motion compensator 122 performs motion compensation wherein an image signal corresponding to a prediction area is output as a prediction signal by the use of any of the motion vector of 0.5-pixel precision, the motion vector of 1-pixel precision, and the motion vector of 2-pixel precision.

In the modification 1 so constructed, according to a result of comparison between the first and second thresholds TH1 and TH2 determined from the processing ability necessary for generating the signal in real time, and the detected largeness of the calculation load, any of the motion vector of 0.5-pixel precision, the motion vector of 1-pixel precision, and the motion vector of 2-pixel precision is generated. Therefore, amount of calculation is changed appropriately at a coding end.

Modification 2 of the First Embodiment

In the modification 2 of the first embodiment, in the calculating unit 120, the motion detector 121 is used to select one of two type of calculating processes which differ from each other in amount of calculation as in the case of the first embodiment, and the motion compensator 112 is used to select one of 4 types of calculating processes which differ from one another in amount of calculation, according to largeness of the calculation load.

To be specific, the role of the load decision unit 114 is, based on first, second, and third thresholds THs, THm, and THb (THs<THm<THb) as indices of the calculation load, to decide whether the calculation load is smaller than the first threshold THs, it is not smaller than the first threshold THs and less than the second threshold THm, it is not smaller than the second threshold THm and less than the third threshold THb, or it is not smaller than the third threshold THb.

The motion detector 121 is used to generate the lower-precision motion vector of 1-pixel precision as motion displacement information indicating the prediction area of the target block, when decided that the calculation load R is not smaller than the third threshold THb by the load decision unit 114, and it is used to generate the higher-precision motion vector of 0.5-pixel precision as the motion displacement information when decided that the calculation load R is smaller than the third threshold THb.

The motion compensator 122 is used to perform overlapping motion compensation by the use of the motion vector of 0.5-pixel precision when the calculation load R is smaller than the first threshold THs, perform overlapping motion compensation by the use of the motion vector of one-pixel precision when the calculation load R is not smaller than the first threshold THs and less than the second threshold THm, perform normal motion compensation by the use of the motion vector of 0.5-pixel precision when the calculation load R is not smaller than the second threshold THm and less than the third threshold THb, and perform normal motion compensation by the use of the motion vector of one-pixel precision when the calculation load R is not smaller than the third threshold THb.

Subsequently, a brief description will be given of operation.

FIG. 3(b) shows flow of the process performed by the calculation unit according to the modification 2 of the first embodiment.

In this modification 2 of the first embodiment, the motion detector 121 performs motion prediction (detection of the motion vector) by performing switching between a heavily loaded process and a lightly loaded process, according to the load decision output Cp of the load decision unit 114, and the motion compensator 122 performs motion compensation (calculation of the prediction signal) by selecting one of four types of motion compensation processes, the calculation loads of which differ from one another, according to the load decision output Cp.

To be more detailed, turning to FIG. 3(b), in a load decision step S11b, the load decision unit 114 decides whether or not the load index R indicating largeness of calculation load at that point of time is smaller than the second threshold THm.

When decided that the load index R is smaller than the second threshold THm in Step S11b, in Step S12b, it is decided whether or not the load index R is smaller than the first threshold THs (THs<THm). When decided that the load index R is not smaller than the second threshold THm in the load decision step S11b, in step S13b, it is decided whether or not the load index R is smaller than the third threshold THb (THb>THm).

When decided that the load index R is smaller than the first threshold THs in the load decision step S12b, in step S14b, the motion detector 121 generates the motion vector of 1-pixel precision and the motion vector of 0.5-pixel precision, and the motion compensator 122 performs overlapping motion compensation by the use of the motion vector of 0.5-pixel precision.

When decided that the load index R is not smaller than the first threshold THs in the load decision step S12b, in step S15b, the motion detector 121 generates the motion vector of 1-pixel precision and the motion vector of 0.5-pixel precision, and the motion compensator 122 performs overlapping motion compensation by the use of the motion vector of 1-pixel precision.

When decided that the load index R is smaller than the third threshold THb in the load decision step S13b, in step S16b, the motion detector 121 generates the motion vector of 1-pixel precision and the motion vector of 0.5-pixel precision, and the motion compensator 122 performs normal motion compensation by the use of the motion vector of 0.5-pixel precision.

When decided that the load index R is not smaller than the third threshold THb in the load decision step S13b, in step S17b, the motion detector 121 generates the motion vector of 1-pixel precision and the motion compensator 122 performs normal motion compensation by the use of the motion vector of one-pixel precision.

Thus, in accordance with the modification 2 of the first embodiment so constructed, according to a result of comparison between the first to third thresholds THs, THm, and THb determined from the processing ability necessary for generating the signal in real time, and the detected largeness of the calculation load, the motion detector performs switching of pixel precision, and the motion compensator performs switching of the type of the motion compensation. Therefore, it is possible to select amount of calculation among many alternatives within a wider range at the coding end.

Embodiment 2.

Figure 4:
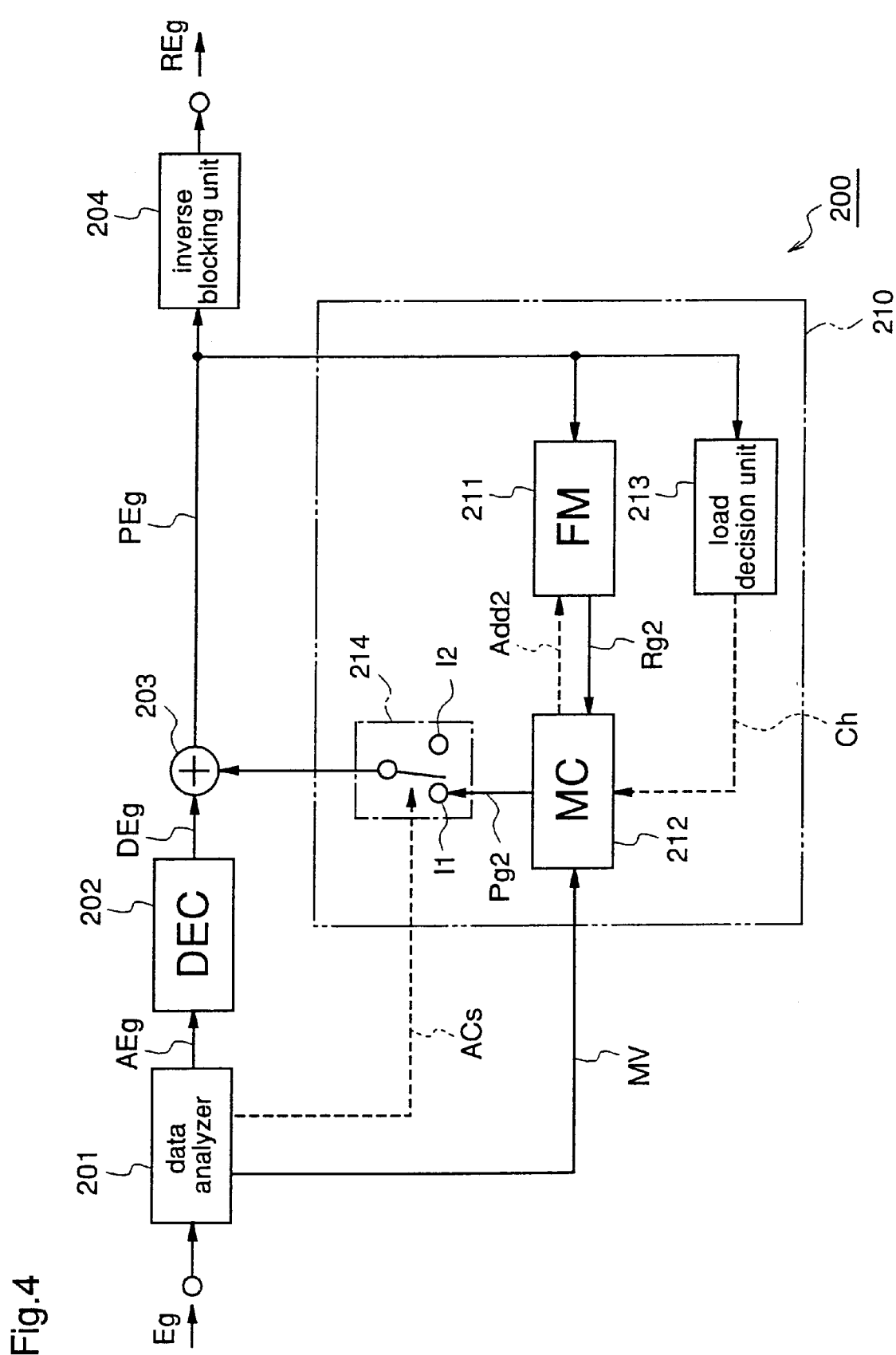
FIG. 4 is a block diagram showing an image decoding apparatus according to a second embodiment of the present invention.
Figure 5:
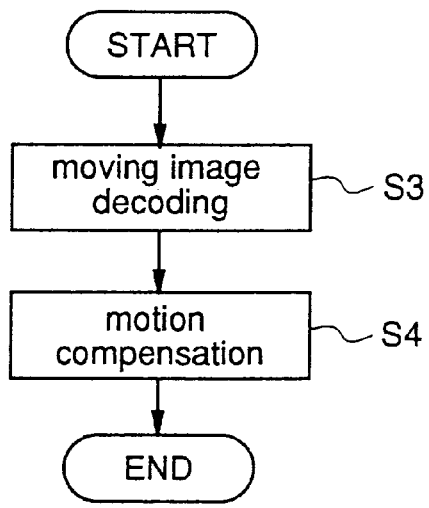
FIGS. 5(*a*) and 5(*b*) are flowcharts showing a decoding process and a motion compensation process performed by the image decoding apparatus of the second embodiment, respectively.
Figure 5:
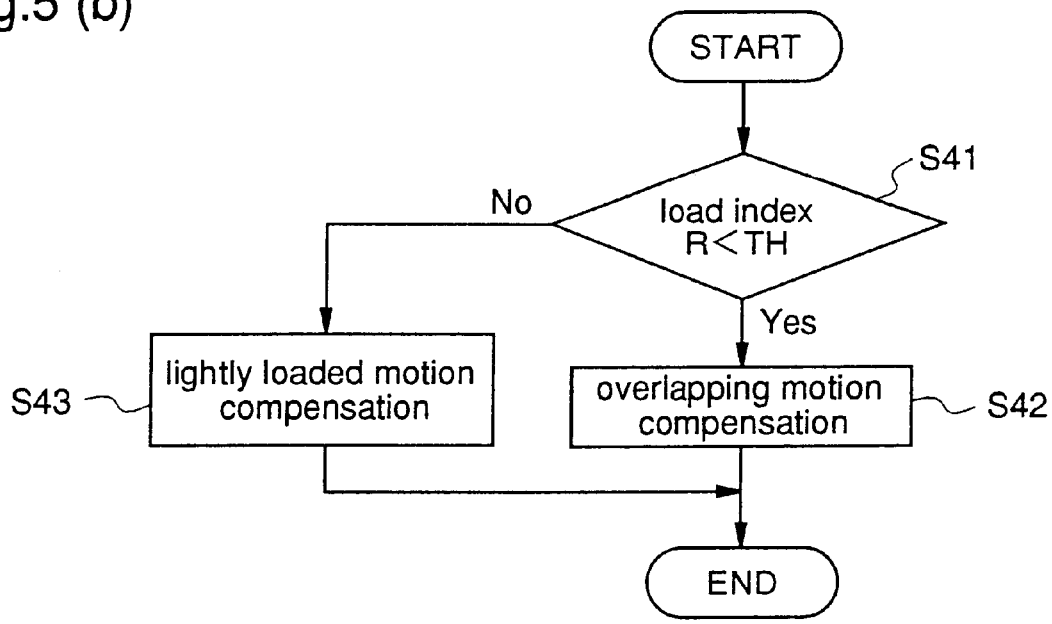

FIG. 4 is a block diagram for explaining an image decoding apparatus according to a second embodiment of the present invention.

Turning now to FIG. 2, there is shown an image decoding apparatus 200 of the second embodiment. The image decoding apparatus 200 is adapted to the image coding apparatus 100 of the first embodiment. While the image decoding apparatus 200 is capable of processing a coded image signal corresponding to an object area according to MPEG4 in addition to a coded image signal corresponding to one frame according to MPRG1 and 2, basic decoding process is performed for the coded image signals in the same manner, and therefore a description will be given of processing of the coded image signal corresponding to one frame. According to MPEG4, as in the case of the process for decoding the coded image signal of one frame, coded image signals corresponding to respective blocks are decoded, and synthesized to obtain a regenerated image signal corresponding to one frame.

To be specific, the image decoding apparatus 200 includes a data analyzer 201 which receives a coded signal Eg (coded image signal or coded difference signal) corresponding to a target area to be decoded (target block), performs analysis and variable length coding to the coded signal Eg, a data decompressor (DEC) 202 which decompresses an output AEg of the data analyzer 201 and outputs a decompressed image signal DEg, an adder 203 which adds the output DEg of the data decompressor 202 to a prediction signal Pg2 of the target block or a reference signal (0 level), an inverse blocking unit 204 which integrates regenerated image signals of respective blocks corresponding to an output PEg of the adder 203, and outputs an image output signal RE having a scanning line structure, and a prediction signal generating unit 210 which generates a prediction signal Pg2 of the target block.

The data decompressor 202 includes an inverse quantizer which inversely quantizes the output AEg of the data analyzer 201, and an IDCT unit which subjects the output of the inverse quantizer to IDCT (Inverse Discrete Cosine Transform) and outputs the decompressed image signal DEg.

The prediction signal generating unit 210 includes a frame memory 211 which stores the output PEg of the adder 203 as the regenerated image signal, and a load decision unit 213 which receives the output PEg of the adder 203 and decides largeness of calculation load in the decoding process.

The load decision unit 213 has a construction identical to that of the load decision unit 114 of the first embodiment. The load decision unit 223 is used to make comparison between a load index R indicating largeness of calculation load and a threshold TH of calculation load determined from processing ability of this image decoding apparatus 200, to decide whether or not the processing ability is sufficient per motion compensation, the index R being represented by amount of calculation per unit time (per frame) in the decoding process, and the threshold TM being represented by amount of calculation per unit time in the decoding process which is required for overlapping motion compensation by the use of the motion vector of 0.5-pixel precision.

The construction of the load decision unit 213 is not limited thereto For example, the decision unit 213 may be used to receive only a timing at which local decoding process of a frame image signal is completed from the memory 211 or the like, convert this timing interval into the calculation load index R, and make comparison between the index R and the threshold TH to decide the processing ability. In this case, it is not necessary to send the decoded image signal, i.e., the output PEg of the adder 203, to the load decision unit 213, thereby significantly reducing data to be sent to the load decision unit 213.

The prediction image signal generating unit 210 includes a motion compensator 212 which generates an address Add2 of the frame memory 211 based on the motion vector MV of the target block which has been decoded by the data analyzer 201, detects a regenerated image signal of a prediction area in a previous frame including the regenerated image signal having the smallest error with respect to the regenerated image signal of the target block, and calculates the prediction image signal Pg2 based on the regenerated image signal. The prediction image signal Pg2 is output to the adder 203 through the switch 214 controlled by a control signal ACS from the data analyzer 201. The switch 214 is used to select one of an input terminal I1 to which the prediction signal Pg is input, and an open input terminal I2, in accordance with control signal ACs. When the switch 214 selects the input terminal I2, the reference signal is supplied to the adder 203 as the output of the switch 214. The reference signal is a signal having "0" level herein.

The motion compensator 212 is used to perform switching between the normal motion compensation and the overlapping motion compensation, for performing motion compensation to find the prediction signal by the use of the motion vector output from the data analyzer 201, according the output Cp of the load decision unit 114. To be specific, when the calculation load is large, the motion compensator 212 uses the motion vector of 1-pixel precision or a vector value for the motion vector of 1-pixel precision obtained by rounding the motion vector of 0.5-pixel precision, to perform normal motion compensation which reduces amount of calculation, whereas when the calculation load is small, the motion compensator 212 uses the motion vector of 1-pixel precision or the motion vector of 0.5-pixel precision, to perform overlapping motion compensation which increases amount of calculation but improves the image quality.

Subsequently, a description will be given of operation.

FIG. 5(a) is a flowchart for explaining the process for decoding the image signal performed by the image processing apparatus of the second embodiment.

Initially, in Step S3, image decoding process is performed.

To be more detailed, the coded signal Eq is input to the image processing apparatus 200, and the data analyzer 201 performs data analysis, and outputs variable length decoded image signal to the data decompressor 202. Simultaneously, the data analyzer 201 outputs the motion vector MV of the target block to-be-decoded to the motion compensator 212 of the prediction signal generating unit 210, and supplies the control signal (mode signal)ACs according to a coding mode of the target block to the switch 214 of the prediction signal generating unit 210.

The data decompressor 202 decompresses a variable length decoded signal, to restore the image signal or the difference signal as the decompressed signal DEg.

To be specific, in the data decompressor 202, the inverse quantizer inversely quantizes the variable length decoded signal, and further, the IDCT unit performs inverse frequency transformation by transforming a signal in a frequency domain into a signal in a spatial domain.

In Step 54, motion compensation process is carried out.

The motion compensator 212 generates the address Add2 for accessing the frame memory 211 from the motion vector MV, reads the prediction signal Pg2 of the target block from the frame memory 211 which contains the regenerated image signal Rg2 of the previous frame. The motion compensator 212 generates the prediction signal Pg2 controlled by the control signal Ch according to the calculation load.

When the mode signal ACs indicates an inter-frame coding mode, the switch 214 selects the input terminal I1. The prediction signal Pg2 and the output DEg of the data compressor 202 are input to the adder 203, which adds these signals, and outputs the decoded image signal PEg as the addition value of these signals. On the other hand, when the mode signal ACs indicates an intra-frame coding mode, the switch 214 selects the input terminal 2, and thereby the output DEg of the data decompressor 202 is sent to the inverse blocking unit 204 through the adder 203.

The output PEg of the adder 203 is supplied to the blocking unit 204, which performs integration to convert it into the image signal REg having a scanning line structure.

The adder 203 outputs the regenerated image signal PEg to the frame memory 211 and the load decision unit 213. The load decision unit 213 decides the amount of calculation in the decoding process, and outputs the control signal Ch according to the decision result to the motion compensator 212.

Hereinafter, a detailed description will be given of motion compensation process performed by the motion compensator 212.

FIG. 5(b) is a flowchart showing the motion compensation process.

In a load decision S41, the load decision unit 213 decides the largeness of the load index R. When decided that the index R of the calculation load is smaller than the threshold TH determined from the processing ability of the image decoding apparatus 200, in Step S42, the motion compensator 212 performs the overlapping motion compensation which calculates large amount of data but improves coding efficiency by the use of the motion vector (the motion vector of 0.5-pixel precision or the motion vector of 1-pixel precision) from the data analyzer 201. When decided that the index R is larger than the threshold TH, in Step S43, the motion compensator 212 performs the normal motion compensation which calculates data less than that of the overlapping motion compensation. When the motion vector of 0.5-pixel precision is sent from the data analyzer 201, its values is rounded, and the resulting vector value of the motion vector of 1-pixel precision is used.

Thus, in accordance with the second embodiment, in the process for decoding the coded image signal, when the largeness of the calculation load is larger than the threshold of the load determined from the processing ability of the image decoding apparatus 200, the overlapping motion compensation which is effective in improvement of an image quality of a regenerated image, is replaced by the normal motion compensation which processes data less than that of the overlapping motion compensation. Switching between the motion compensation processes is performed depending upon the calculation load when decoding the coded image signal in real time, whereby adverse effects on the regenerated image caused by low processing ability is avoided.

To be more detailed, in the prior art decoding method, the prediction signal is generated by the motion compensation adapted to the motion compensation selected in the coding process, while in the second embodiment, when the processing ability of the apparatus in the decoding process is low, the motion compensation which is lightly loaded is performed instead of performing the motion compensation selected in the coding process. For example, when the overlapping motion compensation has been performed in the coding process, the normal motion compensation is performed depending upon the calculation load in the decoding process.

For this reason, in the second embodiment, for the case where a quality of video obtained by real-time decoding process is significantly degraded due to the lack of the processing ability of the prior art image decoding apparatus, motion compensation is carried out depending upon the processing ability, to avoid adverse effects on the video.

While the overlapping motion compensation is changed into the normal motion compensation when the load index R is larger than the threshold, bidirectional prediction or interlacing prediction may be changed into forward prediction or frame prediction, respectively, as in the case of the first embodiment.

Further, the switching of the motion compensation process by the motion compensator is not limited to the case where the motion compensator performs switching of pixel precision and switching of the type of motion compensation in concert with each other, as described in the second embodiment. A variety of alternatives are possible. Hereinafter, a description will be given of the switching method different from that of the second embodiment.

Modification 1 of Second Embodiment

In the modification 1 of the second embodiment, in the prediction signal generating unit 210, the motion compensator 212 is adapted to use the motion vector of 1-pixel precision, regardless of whether the data analyzer 201 has obtained the motion vector of 0.5-pixel precision or the motion vector of 1-pixel precision, and perform switching between the overlapping motion compensation and the normal motion compensation.

To be specific, in this modification 1, the motion compensaror 212 is used for receiving a decision result from the load decision unit 213, and performing the overlapping motion compensation by the use of the motion vector of 1-pixel precision when the calculation load R is smaller than the threshold TH determined from the processing ability of the image decoding apparatus, and performing normal motion compensation by the use of the motion vector of 1-pixel precision when the calculation load R is larger than the threshold TH. Also in this modification 1, when the data analyzer 201 obtains the motion vector of 0.5-pixel precision, the value of the pixel is rounded to generate the motion vector of 1-pixel precision.

In the motion compensation process according to modification 1 of the second embodiment, when the motion vector of 1-pixel precision is sent from the coding end, the motion vector of 1-pixel precision is used, while when the motion vector of 0.5-pixel precision is sent, the value of the motion vector is rounded to generate the motion vector of 1-pixel precision.

Subsequently, a brief description will be given of operation.

FIG. 6(a) shows flow of processing performed by the calculating unit according to the modification 1 of the second embodiment.

In this modification 1, the motion compensator 212 performs motion compensation (calculation of the prediction signal) in such a manner that switching is performed between the overlapping motion compensation and the normal motion compensation which is lightly loaded, according to the load decision output Ch of the load decision unit 213.

Turning to FIG. 6(a), in a load decision step S41a, the load decision unit 213 decides whether or not the load index R indicating largeness of the calculation load at that point of time is smaller than the threshold TH determined from the processing ability of the image decoding apparatus.

When decided that the load index R is smaller than the threshold TH, in Step S42a, the motion compensator 212 performs overlapping motion compensation by the use of the motion vector of 1-pixel precision, to generate the prediction signal. On the other hand, when decided that the load index R is not smaller than the threshold TH in Step S41a, in Step S43a, the motion compensator 212 performs the normal motion compensation by the use of the motion vector of 1-pixel precision, to generate the prediction signal.

Thus, in accordance with the modification 1 of the second embodiment, according to the load decision output Ch of the load decision unit 213, the motion compensator 212 performs switching between the overlapping motion compensation by the use of the motion vector of 1-pixel precision and the normal motion compensation of 1-pixel precision which is lightly loaded. In other words, switching of the type of the motion compensation is performed without performing switching of the pixel precision. As a result, degradation of an image quality of a regenerated image due to the increased calculation load can be suppressed with a relatively simple circuit construction.

Modification 2 of the Second Embodiment

In this modification 2 of the second embodiment, in the prediction signal generating unit 210, the motion compensator 212 performs switching of pixel precision, i.e., switching between the normal motion compensation by the use of 1-pixel precision and normal motion compensation by the use of 0.5-pixel precision, without performing switching between the overlapping motion compensation and the lightly loaded normal motion compensation.

In this modification 2, the motion compensator 212 is used for receiving the load decision output Ch of the load decision unit 213 and performing normal motion compensation by the use of the motion vector of 0.5-pixel precision when the load index R is smaller than the threshold TH determined from the processing ability of the image decoding apparatus, and performing normal motion compensation by the use of the motion vector of 1-pixel precision when the load index R is larger than the threshold TH.

In the motion compensation according to the modification 2 of the second embodiment, only when the motion vector of 0.5-pixel precision is sent from the coding end, the switching of the pixel precision is carried out, while the motion vector of 1-pixel precision is sent therefrom, the switching is not carried out.

Subsequently, a description will be given of operation and effects.

Figure 6:
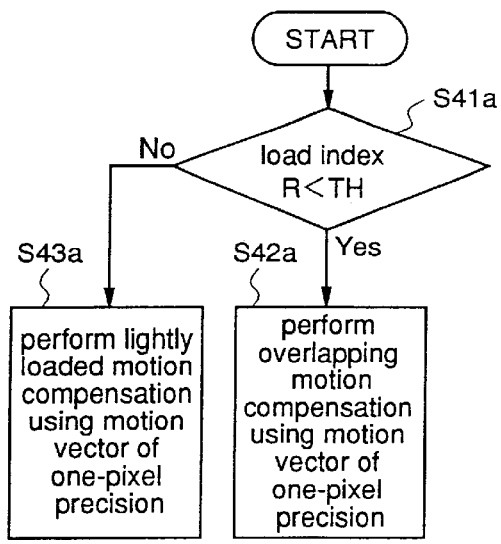
FIGS. 6(*a*)–6(*c*) are flowcharts showing motion compensation processes performed by image decoding apparatuses according to first, second, and third modifications of the second embodiment, respectively.
Figure 6:
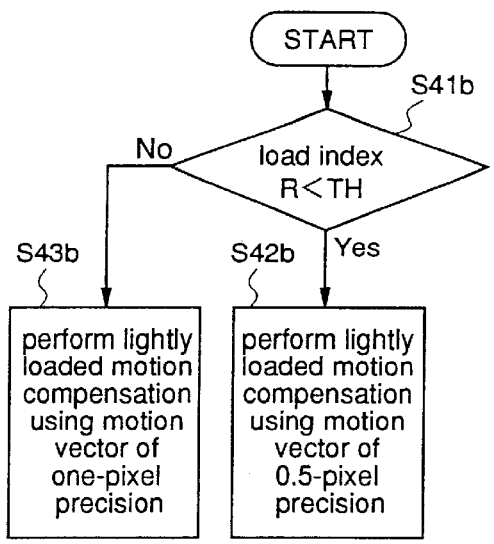
Figure 6:
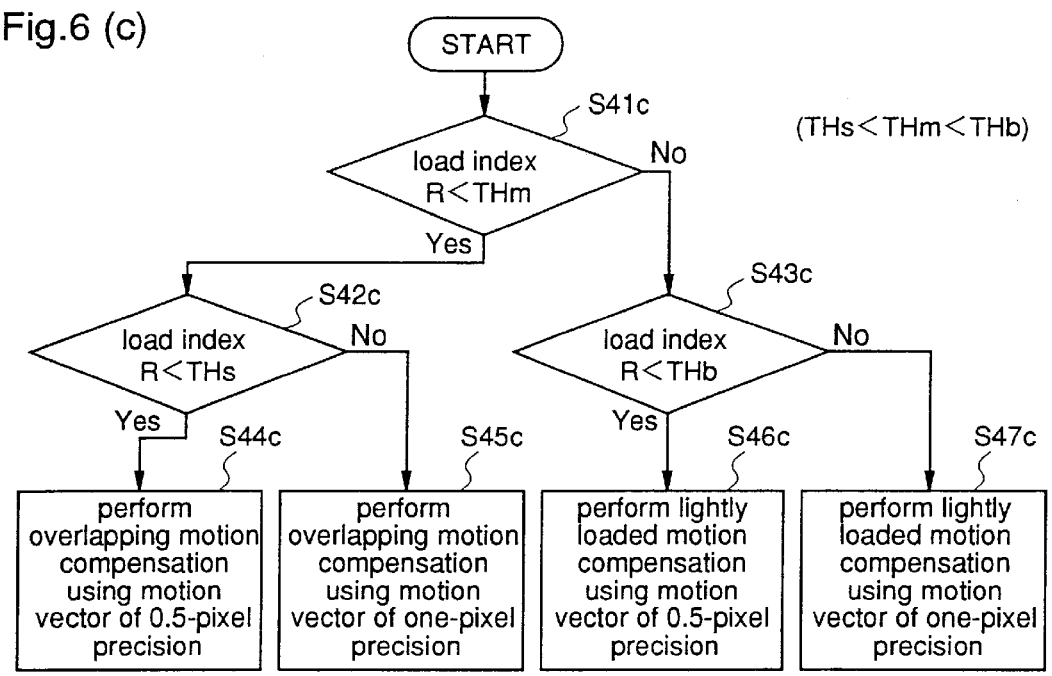
Figure 7:
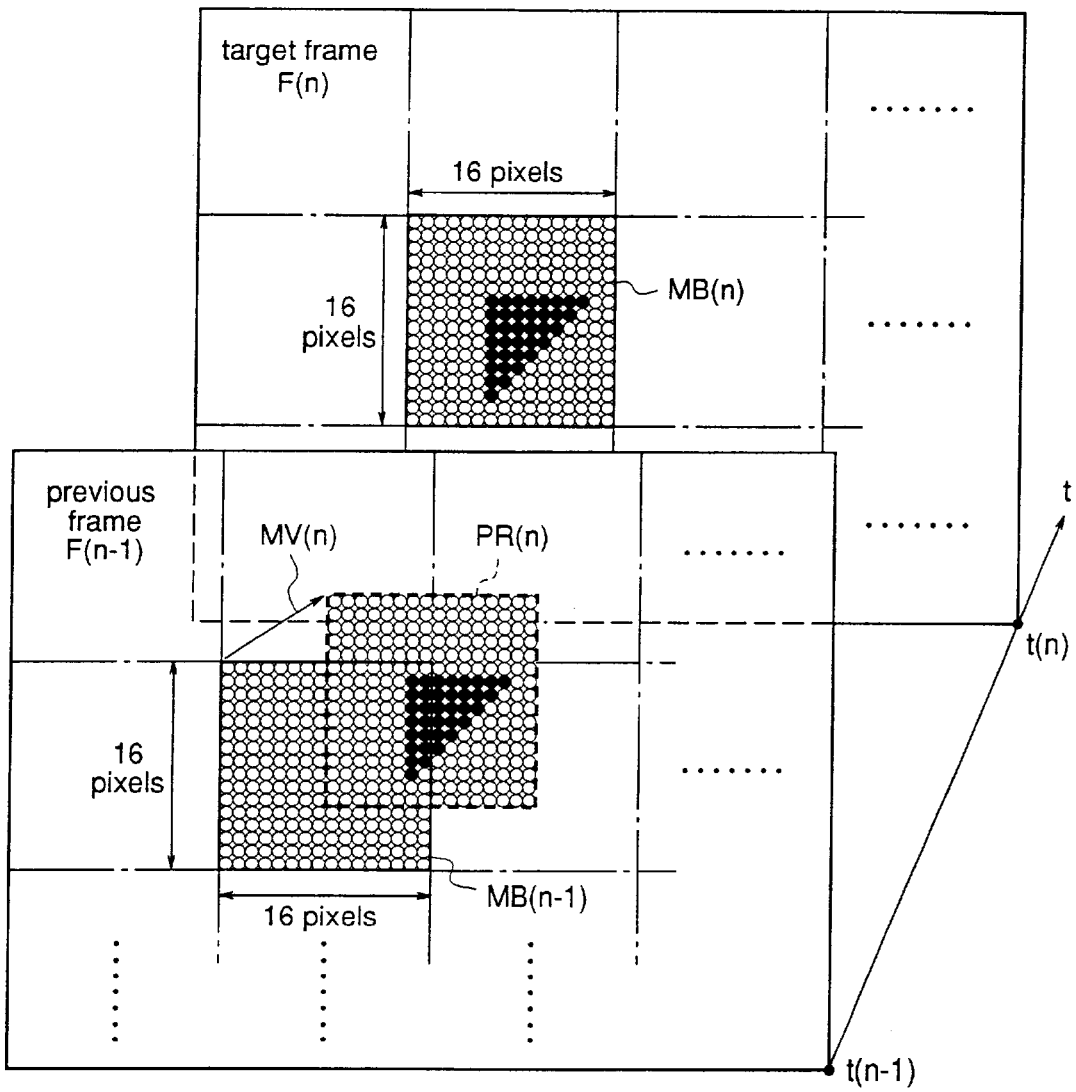
FIGS. 7(*a*)–7(*d*) are diagrams for explaining a motion compensation process performed by a prior art image decoding apparatus according to MPEG 1 and 2.
Figure 7:
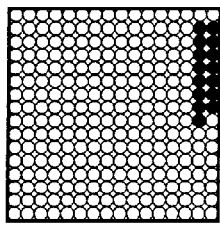
Figure 7:
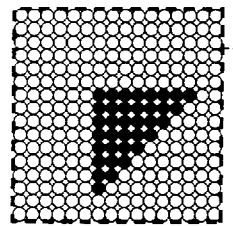
Figure 7:
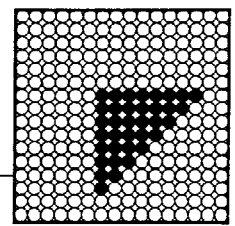
Figure 8:
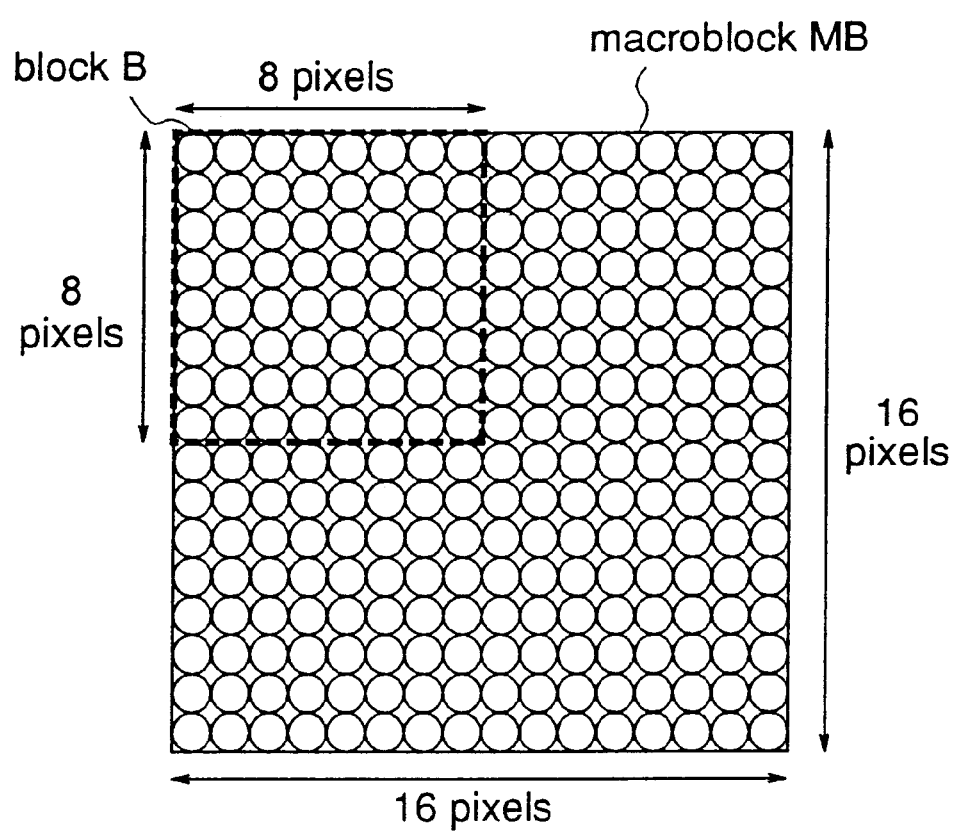
FIG. 8 is a diagram showing relationship between a macroblock comprising (16×16) pixels and a block comprising (8×8) pixels.
Figure 9:
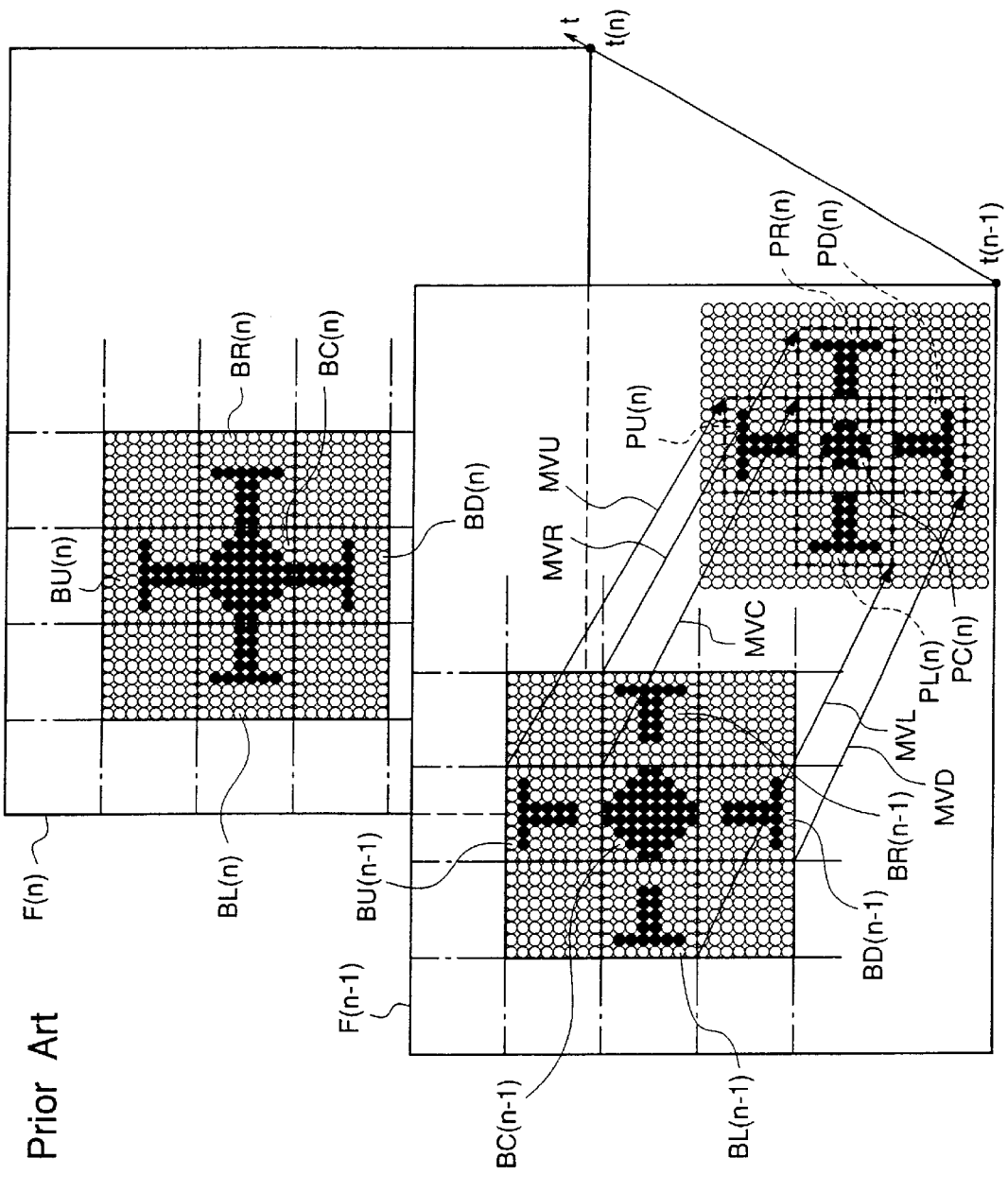
FIG. 9 is a diagram for explaining an overlapping motion compensation process in a prior art image decoding method.
Figure 10:
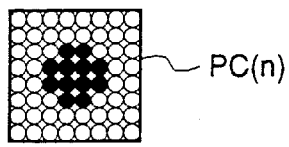
FIGS. 10(*a*)–10(*c*) are diagrams for explaining a process for generating a prediction signal in the overlapping motion compensation process.
Figure 10:
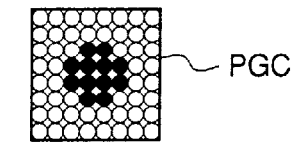
Figure 10:
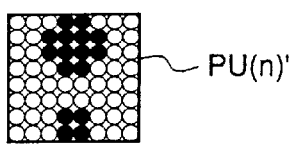
Figure 10:
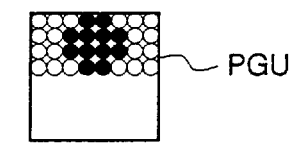
Figure 10:
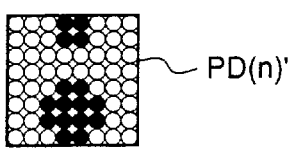
Figure 10:
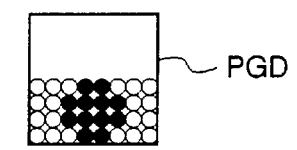
Figure 10:
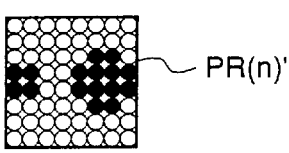
Figure 10:
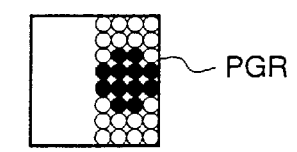
Figure 10:
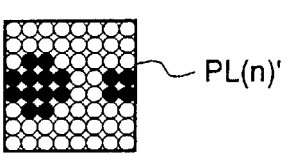
Figure 10:
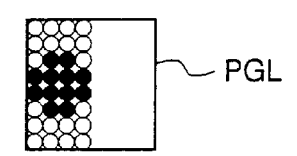
Figure 10:
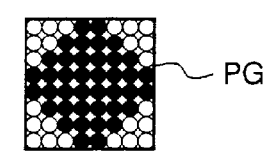
Figure 11:
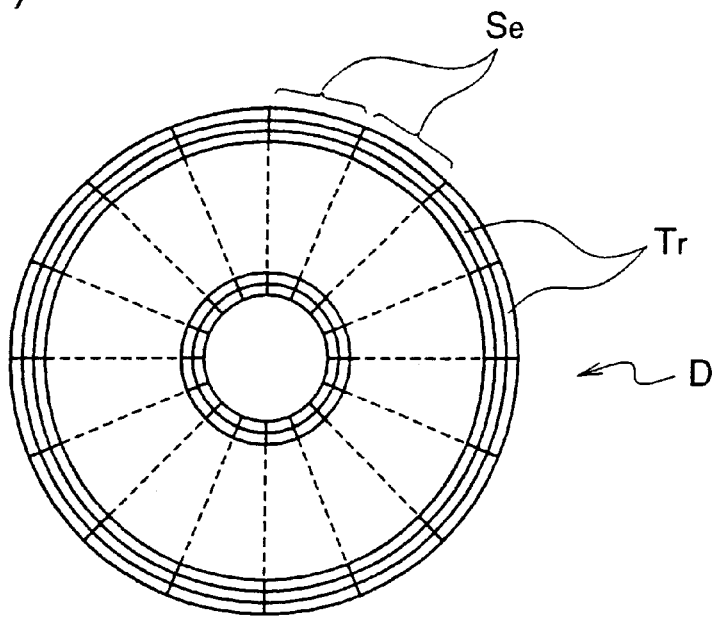
FIGS. 11(*a*)–11(*c*) are diagrams for explaining a data storage medium which contains a program for implementing a coding process or a decoding process performed by the image processing apparatus of each of the above embodiments in a computer system.
Figure 11:
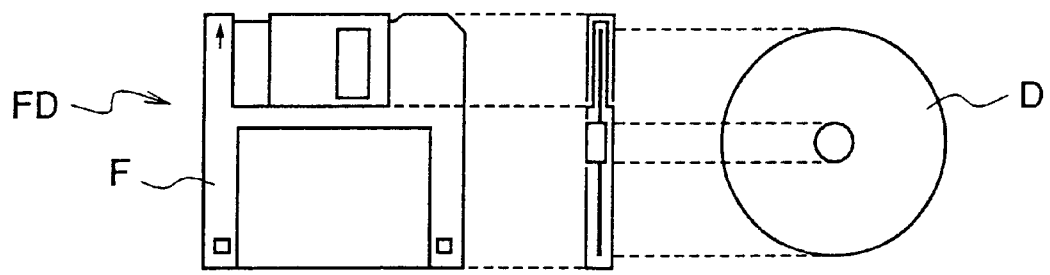
Figure 11:
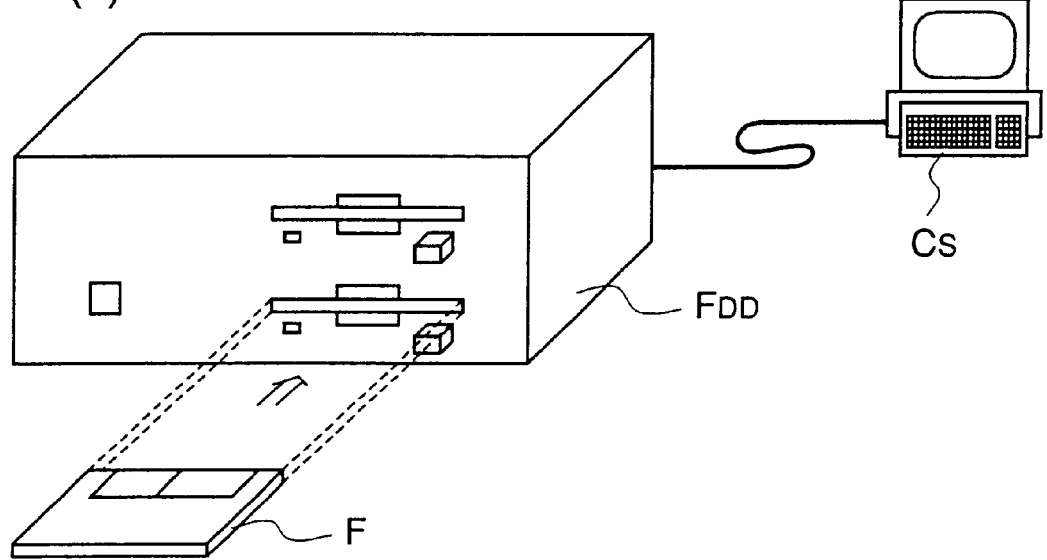
Figure 12:
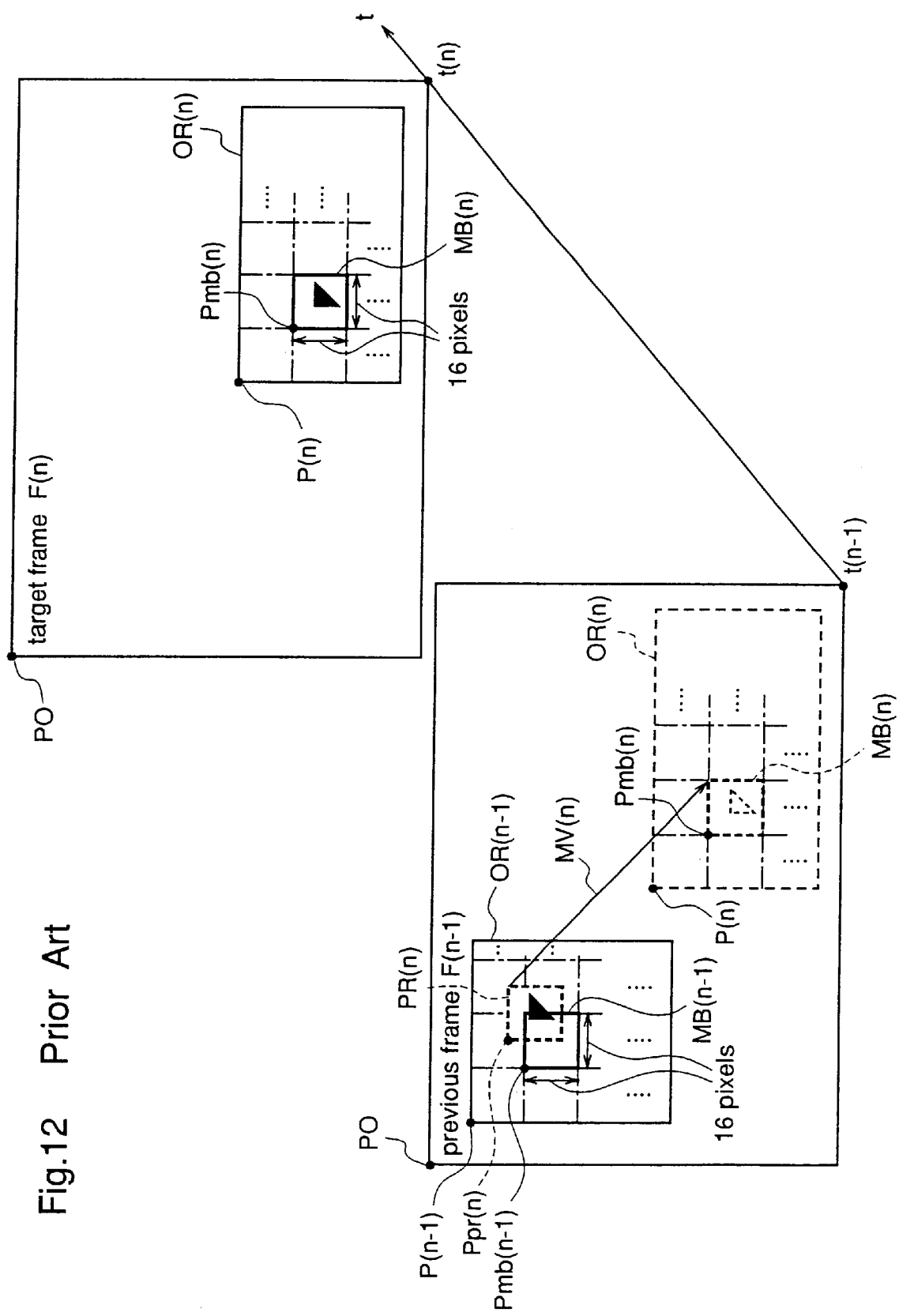
FIG. 12 is a diagram for explaining a motion compensation process in the prior art image decoding method according to MPEG4.

FIG. 6(*b*) shows flow of processing performed by the prediction signal generating unit according to the modification 2 of the second embodiment.

The motion compensator 212 performs motion compensation (calculation of the prediction signal) in such a manner that switching is performed between the normal motion compensation by the use of the motion vector of 0.5-pixel precision and the normal motion compensation by the use of the motion vector of 1-pixel precision, according to the load decision output Ch of the load decision unit 213.

Turning to FIG. 6(*b*), in a load decision step S41*b*, the load decision unit 213 decides whether or not the load index R indicating largeness of the calculation load at that point of time is smaller than the threshold Th determined from the processing ability of the image decoding apparatus.

When decided that the load index R is smaller than the threshold TH in step S41*b*, in Step S42*b*, the motion compensator 212 performs normal motion compensation by the use of the motion vector of 0.5-pixel precision, to generate the prediction signal. On the other hand, when decided that the load index R is not smaller than the threshold TH in Step S41*b*, in Step 543*b*, the motion compensator 212 performs the normal motion compensation by the use of the motion vector of 1-pixel precision, to generate the prediction signal.

Thus, in accordance with the modification 2 of the second embodiment, according to the load decision output Ch of the load decision unit 213, the motion compensator 212 performs switching between the normal motion compensation by the use of the motion vector of 0.5-pixel precision and the normal motion compensation by the use of the motion vector of 1-pixel precision. In other words, switching of the pixel precision is carried out without performing switching of the type of the motion compensation. As a result, degradation of an image quality of a regenerated image due to the increased calculation load can be suppressed with a relatively simple circuit construction.

In the modification 2 of the second embodiment, only when the motion vector of 0.5-pixel precision is sent from the coding end, the switching of the pixel precision is carried out, while the motion vector of 1-pixel precision is sent therefrom, the switching is not carried out. The switching is not limited to this.

For instance, the switching may be performed in the same manner regardless of the motion vector sent from the coding end.

To be more detailed, when the motion vector of 0.5-pixel precision is sent from the coding end, the motion compensation (1-pixel precision) uses the motion vector of 1-pixel precision by rounding the motion vector of 0.5-pixel precision, while the motion compensation (0.5-pixel precision) uses the motion vector of 0.5-pixel precision. On the other hand, when the motion vector of 1-pixel precision is sent from the coding end, the motion compensation (1-pixel precision) uses the motion vector of 1-pixel precision, while the motion compensation (0.5-pixel precision) uses the motion vector of 0.5-pixel precision generated from the motion vector of 1-pixel precision.

The motion compensation may be implemented by the hierarchical calculation, or by the module calculation.

To be specific, the motion vector of 0.5-pixel precision is generated by additional second calculation in addition to basic first calculation for generating the motion vector of 1-pixel precision, and the switching of the pixel precision is performed depending upon whether or not to perform the additional calculation. Besides, there are provided with a first module for generating the motion vector of one-pixel precision and a second module for generating the motion vector of 0.5-pixel precision, and the switching is performed between these, thereby performing switching of the pixel precision.

The switching of the pixel precision is not limited to the switching between 0.5-pixel precision and 1-pixel precision. This may be performed between 0.5-pixel precision and 2-pixel precision, or 1-pixel precision and 2-pixel precision, and further, one of 0.5-pixel precision, 1-pixel precision, and 2-pixel precision may be selected according to the calculation load. Moreover, as the pixel precision, higher precision, for example, 0.25-pixel precision or 0.125-pixel precision may be used.

Modification 3 of the Second Embodiment

In this modification 3 of the second embodiment, in the prediction signal generating unit 210, the motion compensator 212 performs switching among 4 types of calculating processes, according to largeness of the calculation load.

To be specific, in this modification 3, the role of the load decision unit 213 is, based on first, second, and third thresholds THs, THm, and THb (THs<THm<THb) as indices of the calculation load, to decide whether the calculation load R is smaller than the first threshold THs, it is not smaller than the first threshold THs and less than the second threshold THm, it is not smaller than the second threshold THm and less than the third threshold THb, or it is not smaller than the third threshold THb.

The motion compensator 212 is used for performing overlapping motion compensation by the use of the motion vector of 0.5-pixel precision when the calculation load R is smaller than the first threshold THs, perform overlapping motion compensation by the use of the motion vector of 1-pixel precision when the calculation load R is not smaller than the first threshold THs and less than the second threshold THm, perform normal motion compensation by the use of the motion vector of 0.5-pixel precision when the calculation load R is not smaller than the second threshold THm and less than the third threshold THb, and perform normal motion compensation by the use of 1-pixel precision when the calculation load R is not smaller than the third threshold THb.

Subsequently, a description will be given of operation.

FIG. 6(b) shows flow of processing performed by the prediction signal generating unit according to modification 3 of the second embodiment.

In this modification 3, the motion compensator 212 performs motion compensation (calculation of the prediction signal) in such a manner that one motion compensation is selected among 4 typens of motion compensation processes, the loads of which differ from one another, according to the load decision output Ch of the load decision unit 213.

Turning to FIG. 6(c), in a load decision step S41c, the load decision unit 213 decides whether or not the load index R is smaller than the second threshold THm.

When decided that the load index R is smaller than the second threshold THm in step S41c, in Step S42c, it is decided whether or not the load index R is smaller than the first threshold THs (THs<THm). On the other hand, when decided that the load index R is not smaller than the second threshold THm in step S41c, in Step S43c, it is decided whether or not the load index R is smaller than the third threshold THb (THb>THM).

When decided that the load index R is smaller than the first threshold THs in Step S42c, in Step S44c, the motion compensator 212 performs overlapping motion compensation by the use of the motion vector of 0.5-pixel precision.

When decided that the load index R is not smaller than the first threshold THS in Step S42c, in Step S45c, the motion compensator 212 performs overlapping motion compensation by the use of the motion vector of 1-pixel precision.

When decided that the load index R is smaller than the third threshold THb in Step S43c, in step S46c, the motion compensator 212 performs normal motion compensation (lightly loaded motion compensation) by the use of the motion vector of 0.5-pixel precision.

When decided that the load index R is not smaller than the third threshold THb in Step S43c, in Step s47c, the motion compensator 212 performs normal motion compensation by the use of the motion vector 1-pixel precision.

Thus, in accordance with the modification 3 of the second embodiment so constructed, according to a result of comparison between the first to third thresholds determined from processing ability necessary for generating the signal in real time, and the detected largeness of the calculation load, switching of pixel precision and the type of motion compensation is performed, to realize 4 types of processes. Therefore, it is possible to select amount of calculation among many alternatives within a wider range, at the coding end.

Furthermore, a coding or decoding program which implements construction of the image coding process or image decoding process of each embodiment and its modification is stored in a data storage medium such as a floppy disc, whereby the coding or decoding is carried out in an independent computer system with ease. This is described below.

FIGS. 11(a)–11(c) are diagrams showing a case in which the image coding process performed by the image coding apparatus of the first embodiment or its modification, or the image decoding process performed by the image decoding apparatus of the second embodiment or its modification is carried out in a computer system using a floppy disc which contains the coding or decoding program.

FIG. 11(a) shows a physical format of a floppy disc body D as a storage medium body, and FIG. 11(b) shows a front appearance and a cross-section of a floppy disc FD, and the floppy disc body D. Referring to FIGS. 11(a) and 11(b), the floppy disc body D is stored in a case F and in a surface thereof, plural tracks Trs are formed concentrically from outer to inner radius thereof, each track being divided into 16 sectors Se in an angle direction. Data of the program is recorded in allocated areas on the floppy disc body D.

FIG. 11(c) is a diagram showing a construction with which the program is recorded/reproduced in/from the floppy disc FD. In case of storage the program in the floppy disc FD, data of the program is written thereto through a floppy disc drive FDD from a computer system Cs. In another case of constructing the coding or the decoding process in the computer system Cs using the program in the floppy disc FD, the program is read from the floppy disc FD by means of the floppy disc drive FDD and transferred to the computer system Cs.

Although the floppy disc is used as the data storage medium to perform image processing in the computer system in the above description, an optical disc may be used. In addition, the data storage medium is not limited to these, and an IC card, an ROM cassette, and the like may be used so long as it can record a program.

What is claimed is:

1. An image processing method for:
   coding an input image signal for each of unit areas into which a frame is divided and outputting a coded image signal, and
   generating a prediction image signal for a target unit area to be coded in a desired unit area by calculation according to prediction based on a decoded image signal obtained by decoding the coded image signal, said method comprising the step of:
      detecting largeness of calculation load in the process for coding the input image signal, and
      performing switching of the prediction in the process for generating the prediction image signal according to the detected largeness of the calculation load.

2. The image processing method of claim 1 wherein the prediction in the process for generating the prediction image signal is switched between a first prediction which requires a large amount of calculation and a second prediction which requires a small amount of calculation, according to a result of comparison between a threshold of the calculation load determined from processing ability required for the process for generating the prediction signal in real time and the detected largeness of the calculation load.

3. The image processing method of claim 1 wherein the prediction adapted to the detected largeness of the calculation load is selected among plural types of prediction which differ from one another in amount of calculation, according to a result of comparison between a threshold of the calculation load determined from processing ability required for the process for generating the prediction signal in real time and the detected largeness of the calculation load.

4. The image processing method of claim 1 wherein
   the process for generating the prediction image signal includes motion prediction for finding a motion vector indicating a position of a prediction area of the target unit area by predetermined pixel precision, and motion compensation for finding an image signal of the prediction area as the prediction image signal by the use of the motion vector, the motion prediction is switched between motion prediction which requires a large amount of calculation and motion prediction which requires a small amount of calculation, according to a result of comparison between a threshold of the calculation load determined from processing ability required for the process for generating the prediction signal in real time and the detected largeness of the calculation load, and the motion compensation is switched between motion compensation which requires a large amount of calculation and motion compensation which requires a small amount of calculation, according to the result of comparison.

5. The image processing method of claim 1 wherein the process for generating the prediction image signal includes motion prediction for finding a motion vector indicating a position of a prediction area of the target unit area by predetermined pixel precision, and motion compensation for finding an image signal of the prediction area as the prediction image signal by the use of the motion vector, and the motion prediction is switched between motion prediction for finding a motion vector of higher pixel precision and motion prediction for finding a motion vector of lower pixel precision, according to a result of comparison between a threshold of the calculation load determined from processing ability required for the process for generating the prediction signal in real time and the detected largeness of the calculation load.

6. The image processing method of claim 1 wherein the process for generating the prediction signal includes motion prediction for finding a motion vector indicating a position of a prediction area of the target unit area by predetermined pixel precision, and motion compensation for finding an image signal of the prediction area as the prediction image signal by the use of the motion vector, and the motion compensation is switched between motion compensation for finding the prediction image signal by the use of a motion vector of higher pixel precision and motion compensation for finding the prediction image signal by the use of a motion vector of lower pixel precision, according to a result of comparison between a threshold of the calculation load determined from processing ability required for the process for generating the prediction signal in real time and the detected largeness of the calculation load.

7. The image processing method of claim 6 wherein the motion compensation performed by the use of the motion vector of higher pixel precision is switched between first motion compensation which is heavily loaded and second motion compensation which is lightly loaded, according to the result of comparison, and the motion compensation performed by the use of the motion vector of lower pixel precision is switched between first motion compensation which is heavily loaded and second motion compensation which is lightly loaded, according to the result of comparison.

8. The image processing method of claim 1 wherein the process for generating the prediction image signal includes motion prediction for finding a motion vector indicating a position of a prediction area of the target unit area by predetermined pixel precision, and motion compensation for finding an image signal of the prediction area as the prediction image signal by the use of the motion vector, and one of plural types of motion compensation which use motion vectors of different pixel precision is selected as the motion compensation, according to a result of comparison between a threshold of the calculation load determined from processing ability required for the process for generating the prediction signal in real time and the detected largeness of the calculation load.

9. An image processing method for:

decoding an input coded image signal for each of unit areas into which a frame is divided and outputting a decoded image signal, and generating a decoded prediction image signal for a target unit area to be decoded in a desired unit area by calculation according to predetermined motion compensation based on the decoded image signal, said method comprising the step of:

detecting largeness of calculation load in the process for decoding the coded image signal, and performing switching of motion compensation in the process for generating the prediction image signal according to the detected largeness of the calculation load.

10. The image processing method of claim 9 wherein the motion compensation is switched between first motion compensation which requires large amount of calculation and second motion compensation which requires small amount of calculation, according to a result of comparison between a threshold of the calculation load determined from processing ability required for the process for generating the prediction signal in real time and the detected largeness of the calculation load.

11. The image processing method of claim 9 wherein the motion compensation adapted to the detected largeness of the calculation load is selected among plural types of motion compensation which differ from one another in amount of calculation, according to a result of comparison between a threshold of the calculation load determined from processing ability required for the process for generating the prediction signal in real time and the detected largeness of the calculation load.

12. The image processing method of claim 9 wherein the motion compensation is switched between motion compensation for finding the decoded prediction image signal by the use of a motion vector of higher pixel precision and motion compensation for finding the decoded prediction image signal by the use of a motion vector of lower pixel precision, according to a result of comparison between a threshold of the calculation load determined from processing ability required for the process for generating the prediction signal in real time and the detected largeness of the calculation load.

13. The image processing method of claim 12 wherein the motion compensation performed by the use of the motion vector of higher pixel precision is switched between first motion compensation which is heavily loaded and second motion compensation which is lightly loaded, according to the result of comparison, and the motion compensation performed by the use of the motion vector of lower pixel precision is switched between first motion compensation which is heavily loaded and second motion compensation which is lightly loaded, according to the result of comparison.

14. An image processing apparatus including:

a coding unit for coding an input image signal for each of unit areas into which a frame is divided and outputting a coded image signal, and a predicting unit for generating a prediction image signal for a target unit area to be coded in a desired unit area by calculation according to predetermined prediction, wherein the predicting unit includes calculation load detecting means for detecting largeness of calculation load in the process for coding the input image signal, and performs switching of the prediction in the process for generating the prediction signal according to the detected largeness of the calculation load.

15. The image processing apparatus of claim 14 wherein the predicting unit includes a motion detector which outputs a motion vector indicating a position of a prediction area in a previous frame comprising a prediction image signal for the target unit area, based on the input image signal of the target unit area in a target frame to be coded and a decoded image signal of the previous frame which has been decoded; and a motion compensator for generating the prediction image signal by the use of the motion vector of the target unit area which is output from the motion detector;

the motion detector outputting one of a first motion vector of lower pixel precision and a second motion vector of higher pixel precision to the motion compensator as the motion vector, according to the detected largeness of the calculation load.

16. An image processing apparatus including:

a decoding unit for decoding an input coded image signal for each of unit areas into which a frame is divided and outputting a decoded image signal, and a predicting unit for generating a decoded prediction image signal for a target unit area to be decoded in a desired unit area by calculation according to predetermined motion compensation, wherein the predicting unit includes calculation load detecting means for detecting largeness of calculation load in the process for decoding the coded image signal, and performs switching of motion compensation in the process for generating the decoded prediction image signal, according to the detected largeness of the calculation load.

17. The image processing apparatus of claim 16 wherein the predicting unit generates the decoded prediction image signal by the use of a motion vector indicating a position of a prediction area in a previous frame which has been decoded before the target frame is decoded and comprises the decoded prediction image signal for the target unit area, and includes a motion compensator which selects and performs one of first motion compensation which requires small amount of calculation for generating the decoded prediction image signal for the target unit area by the use of the motion vector of the target unit area and second motion compensation which requires large amount of calculation for generating the decoded prediction image signal by the use of the motion vector of the target unit area and its neighboring unit areas, according to the detected largeness of calculation load.

18. A data storage medium for storing a program which makes a computer perform an image coding process, said program comprising the step of:

coding an input image signal for each of unit areas into which a frame is divided and outputting a coded image signal, and generating a prediction image signal for a target unit area to be coded in a desired unit area by calculation according to predetermined prediction based on a decoded image signal obtained by decoding the coded image signal, wherein largeness of calculation load in the process for coding the input signal is detected, and switching of prediction in the process for generating the prediction image signal is performed according to the detected largeness of the calculation load.

19. A data storage medium for storing a program which makes a computer perform an image decoding process, said program comprising the step of:

decoding an input coded image signal for each of unit areas into which a frame is divided and outputting a decoded image signal, and generating a decoded prediction image signal for a target unit area to be decoded in a desired unit area by calculation according to predetermined motion compensation based on the decoded image signal, wherein largeness of calculation load in the process for decoding the coded image signal is detected, and switching of motion compensation in the process for generating the decoded prediction image signal is performed according to the detected largeness of the calculation load.

* * * * *